United States Patent

Mori et al.

Patent Number: 5,677,781
Date of Patent: Oct. 14, 1997

[54] METHOD AND DEVICE FOR MEASURING A NOISE FIGURE IN OPTICAL AMPLIFIERS

[75] Inventors: Tohru Mori, Tokyo; Kazuo Aida, Yokohama, both of Japan

[73] Assignees: Ando Electric Co., Ltd.; Nippon Telegraph And Telephone Corporation, both of Tokyo, Japan

[21] Appl. No.: 593,390

[22] Filed: Jan. 29, 1996

[30] Foreign Application Priority Data

Jun. 30, 1995 [JP] Japan ................... 7-166571

[51] Int. Cl.$^6$ ................... H04B 10/16
[52] U.S. Cl. ................... 359/179; 359/177; 359/341
[58] Field of Search ................... 359/110, 177, 359/179, 337, 341; 356/73.1

[56] References Cited

U.S. PATENT DOCUMENTS

| | | | |
|---|---|---|---|
| 5,471,334 | 11/1995 | Masuda et al. | 359/177 |
| 5,521,751 | 5/1996 | Aida et al. | 359/341 |
| 5,561,551 | 10/1996 | Iwasaki et al. | 359/337 |
| 5,574,534 | 11/1996 | Nogiwa et al. | 359/337 |
| 5,600,481 | 2/1997 | Nakabayashi | 359/341 |

Primary Examiner—Wellington Chin
Assistant Examiner—Rafael Bacares
Attorney, Agent, or Firm—Finnegan, Henderson, Farabow, Garrett & Dunner, L.L.P.

[57] ABSTRACT

A method and device for automatically and accurately measuring a noise figure of an optical amplifier are disclosed. In the method, light pulses which have different wavelengths $\lambda_1 \sim \lambda_n$ and have a period shorter than a time constant of extinction of the optical amplifier are generated. The light pulses thus generate are supplied to the optical amplifier. Powers $P_{AMP1} \sim P_{AMPn}$ of amplified lights outputted from the optical amplifier which correspond to the light pulses and have the wavelength $\lambda_1 \sim \lambda_n$ and powers $P_{ASE1} \sim P_{ASEn}$ of lights which have the wavelength $\lambda_1 \sim \lambda_n$ and are outputted from the optical amplifier when the amplified lights are not outputted from the optical amplifier are measured. Noise figures $NF_1 \sim NF_n$ at the wavelengths $\lambda_1 \sim \lambda_n$ the optical amplifier are calculated according to the following equation.

$$NF_k = (P_{ASEk}/h\nu_k G_k B_o) + (1/G_k) \quad (k=1\sim n)$$

In the above equation, h is Planck's constant; $\nu_k(k=1\sim n)$ are light frequencies of the light pulses; $G_k(k=1\sim n)$ are gains at the wavelengths $\lambda_k(k=1\sim n)$ of the optical amplifier; and Bo is a band width of a pass band of an instrument which is used for measuring the power $P_{ASE1} \sim P_{ASEn}$.

19 Claims, 15 Drawing Sheets

FIG.2A  MODULATION CLOCKS $Q_1 \sim Q_n$ ① 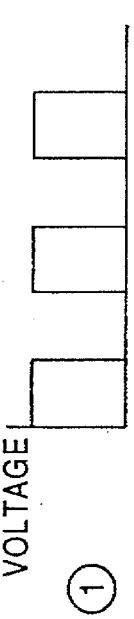
FIG.2B  CONTROL SIGNAL $Q_i$ INPUT ② 
FIG.2C  INPUT LIGHT PULSE ③ 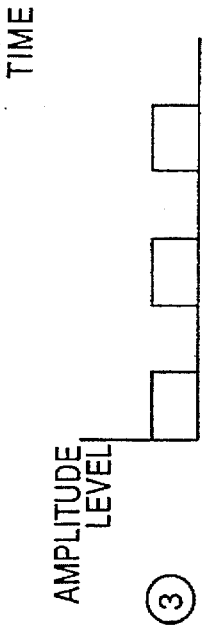
FIG.2D  OUTPUT LIGHT OF OPTICAL AMPLIFIER ④ 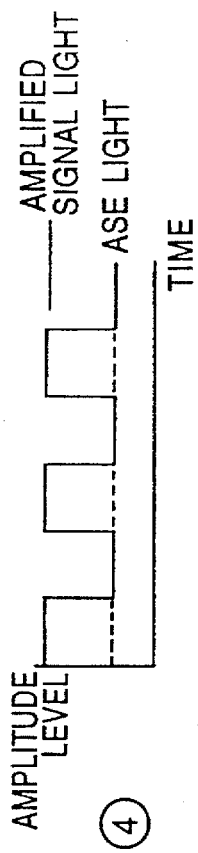
FIG.2E  OUTPUT LIGHT OF OPTICAL SWITCH (ASE LIGHT) ⑤ 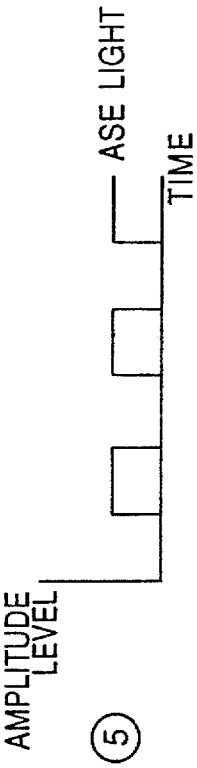

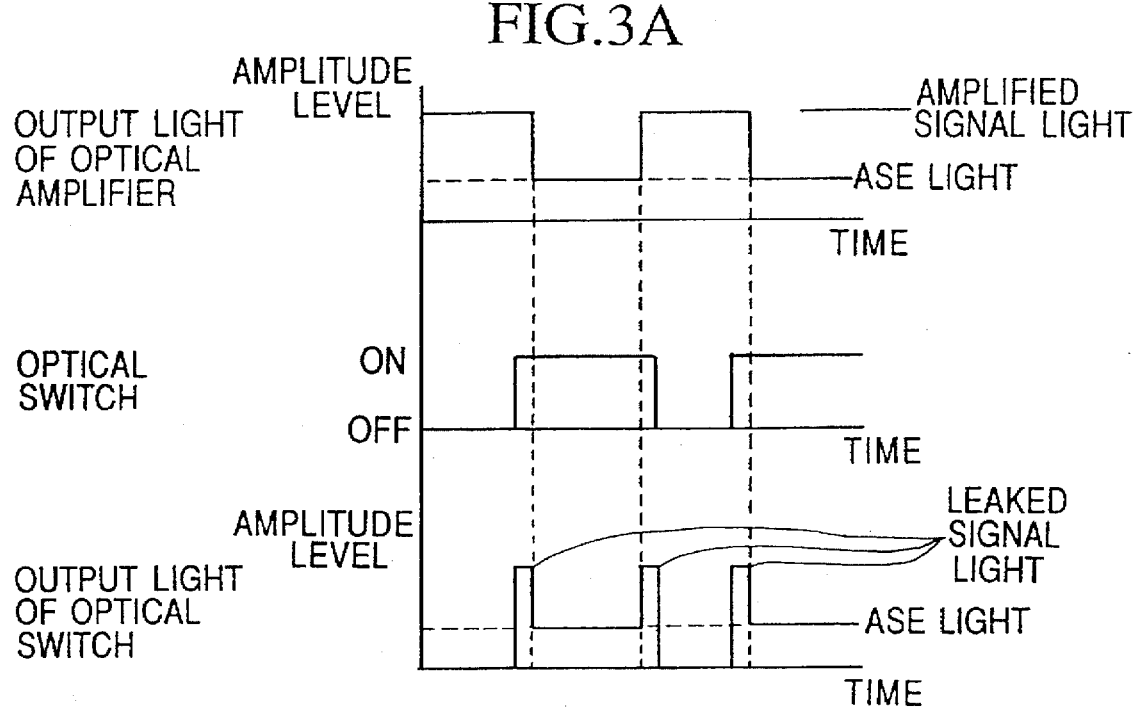
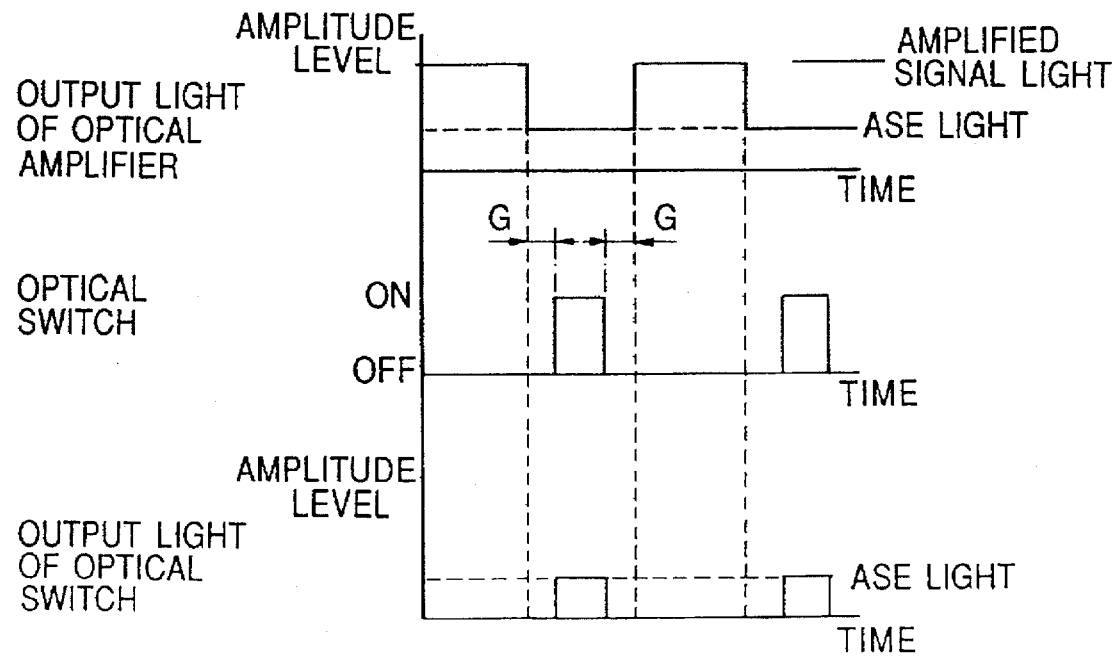

SHORT WAVELENGTH DIVISION MULTIPLEX LIGHT PULSE ⑪

LONG WAVELENGTH DIVISION MULTIPLEX LIGHT PULSE ⑫

INPUT LIGHT OF OPTICAL AMPLIFIER ⑬

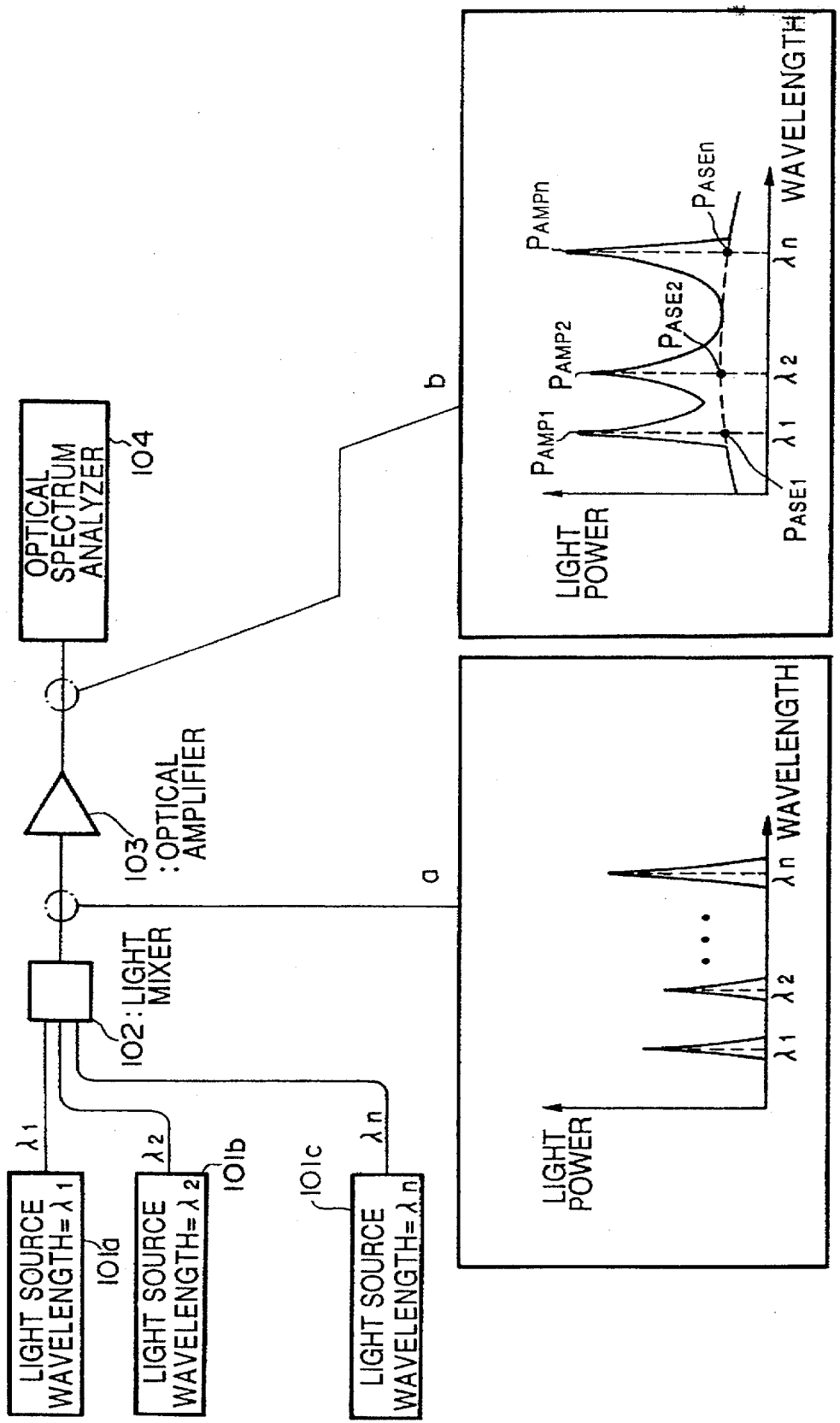

METHOD AND DEVICE FOR MEASURING A NOISE FIGURE IN OPTICAL AMPLIFIERS

BACKGROUND OF THE INVENTION

1. Field of the Invention

The present invention relates to a method and a device for measuring noise figures of optical amplifiers which amplify wavelength division multiplex signal lights.

2. Background

First, a description will be given with respect to a conventional method for measuring noise figures of optical amplifiers.

In a conventional method, signal lights which respectively have wavelengths $\lambda_1 \sim \lambda_n$ are generated by n light sources. The signal lights thus generated are mixed to generate a multiplex wavelength signal light and the multiplex wavelength signal light is inputted to an optical amplifier. As a result, the amplified signal light corresponding to the input wavelength multiplex signal light and the noise light are emitted from the optical amplifier. The noise figures $NF_k$ (k=1~n) of the optical amplifier are then determined as follows:

$$NF_k = (P_{ASEk}/h\, v_k G_k B_o) + (1/G_k) \tag{1}$$

In the above equation, $P_{ASEk}$ is the ASE power of the output light of the optical amplifier and is measured by a light power measuring instrument; $B_o$ is the band width of the light power measuring instrument; $G_k$ is the gain of the optical amplifier; h is Planck's constant; $v_k$ is the light frequency of the signal light; and ASE is an abbreviation of "Amplified Spontaneous Emission". Spontaneous emission is a phenomenon in which an excited atom spontaneously emits light independent of external influence as the energy level of the atom drops from an excited state to the ground state. The ASE is the amplification based on the spontaneous emission.

Generally, the level of the ASE light power $P_{ASEk}$ is very low and is buried in the power $P_{AMPk}$ of the output signal light of the optical amplifier. Therefore, it is difficult to separately measure the ASE light powers and to calculate the noise figures based on the measured ASE light powers according to the above equation (1). For this reason, the noise figure is determined by estimating the ASE light powers.

FIG. 15 shows the configuration of a system for measuring the noise figure of an optical amplifier according to the conventional method. In FIG. 15, light sources 101a, 101b and 101c emit signal lights which have different wavelengths. The signal lights thus emitted are mixed by a light mixer 102. As a result, a wavelength division multiplex signal light is outputted by the light mixer 102 and is inputted to an optical amplifier 103, the noise figures of which are to be determined. The output light of the optical amplifier 102 is analyzed by an optical spectrum analyzer 104.

In FIG. 15, a box (a) shows the spectrums of the input signal light of the optical amplifier and a box (b) shows the spectrums of the output light of the optical amplifier. As shown in the box (a), the input signal light of the optical amplifier 103 contains the spectrums corresponding to the output signal lights of the light source 101a, 101b, and 101c. The output light of the optical amplifier contains the amplified signal lights corresponding to the input signal light and the ASE light as shown in the box (b). The spectrums of the ASE light distribute broader frequency range.

In order to determine the noise figures $NF_k$(k=1~n), it is necessary to determine the powers of the ASE light spectrums which have the wavelengths corresponding to the wavelengths $\lambda_1 \sim \lambda_n$ of the wavelength division multiplex input signal light, i.e., the powers $P_{ASE1} \sim P_{ASEn}$ ("●" are plotted). In order to determine the powers $P_{ASE1} \sim P_{ASEn}$, it is necessary to separately measure the amplified signal lights and the ASE light.

Therefore, inputting no signal to the optical amplifier 103, the operator observes the spectrums of the output light (i.e., the ASE light) of the amplifier by the spectrum analyzer 104. Next, inputting the wavelength division multiplex input signal light to the optical amplifier, the operator observes the output light (i.e., the amplified signal light and the ASE light) by the spectrum analyzer 104. The operator compares the observed spectrums and estimates the powers $P_{ASE1} \sim P_{ASEn}$ of the ASE lights at the wavelengths $\lambda_1 \sim \lambda_n$.

As described above, in order to determine the noise figure of the optical amplifier, it is necessary to determine the power of the ASE lights of the amplifier. However, the powers of the ASE lights are not directly measured and the powers are estimated based on the observation of the spectrums of the output lights of the optical amplifier. Therefore, it is difficult to reduce the dispersion of the powers of the ASE lights estimated by operators and it is difficult to accurately determine the noise figure. Furthermore, in order to automatically determine the noise figures of optical amplifiers, it is necessary to compare the observed spectrums by a computer. Therefore, the system is expensive.

SUMMARY OF THE INVENTION

Accordingly, it is an object of the present invention to provide a method and a device for automatically and accurately measuring a noise figure of an optical amplifier.

In an aspect of the present invention, there is provided a method for measuring noise figures of an optical amplifier, comprising the steps of generating light pulses which have different wavelengths $\lambda_1 \sim \lambda_n$ and have a period shorter than a time constant of extinction of the optical amplifier, supplying the light pulses to the optical amplifier, distinctively measuring powers $P_{AMP1} \sim P_{AMPn}$ of amplified lights outputted from the optical amplifier which correspond to the light pulses and have the wavelength $\lambda_1 \sim \lambda_n$, and powers $P_{ASE1} \sim P_{ASEn}$ of lights which have the wavelength $\lambda_1 \sim \lambda_n$ and are outputted from the optical amplifier when the amplified signal lights are not outputted from the optical amplifier, and calculating noise figures $NF_1 \sim NF_n$ at the wavelengths $\lambda_1 \sim \lambda_n$ of the optical amplifier as described below.

$$NF_k = (P_{ASEk}/h\, v_k G_k Bo) + (1/G_k) \qquad (k=1 \sim n)$$

In the above equation, h is Planck's constant; $v_k$ (k=1~n) are signal light frequencies of the light pulses; $G_k$(k=1~n) are gains at the wavelengths $\lambda_k$(k=1~n) of the optical amplifier; and Bo is a band width of a pass band of an instrument which is used for measuring the power $P_{ASE1} \sim P_{ASEn}$.

The present invention further provides a method for measuring noise figures of an optical amplifier, comprising the steps of generating first and second modulation clocks in anti-phase, the first and second modulation clocks having a period which is shorter than a time constant of extinction of the optical amplifier, generating short wavelength light pulses which have different wavelengths $\lambda_1 \sim \lambda_{n/2}$ and are modulated by the first modulation clock, generating long wavelength light pulses which have different wavelengths $\lambda_{(n/2)+1} \sim \lambda_n$ and are modulated by the second modulation clock, mixing the short and long wavelength light pulses to generate a continuous light, supplying the continuous light to the optical amplifier, supplying the output light of the optical amplifier to an instrument for distinctively measuring powers of spectrums of the output light through an optical switch, switching the optical switch in synchronization with the first or second modulation clock so that powers $PAMP_1 \sim PAMP_{(n/2)}$ at the wavelengths $\lambda_1 \sim \lambda_{n/2}$ of an amplified light which corresponds to the short wavelength pulses and powers $P_{ASE(n/2)+1} \sim P_{ASEn}$ at the wavelengths $\lambda_{(n/2)+1} \sim \lambda_n$ of a light which is outputted when the amplified light is not outputted from the optical amplifier are measured by the instrument, switching the optical switch in synchronization with the first or second modulation clock so that powers $PAMP_{(n/2)+1} \sim PAMP_n$ at the wavelengths $\lambda_{(n/2)+1} \sim \lambda_n$ of an amplified light which corresponds to the long wavelength pulses and powers $P_{ASE1} \sim P_{ASE(n/2)}$ at the wavelengths $\lambda_1 \sim \lambda_{n/2}$ of a light which is outputted when the amplified light is not outputted from the optical amplifier are measured by the instrument, calculating noise figures $NF_1 \sim NF_n$ at the wavelengths $\lambda_1 \sim \lambda_n$ of the optical amplifier as described below.

$$NF_k = (P_{ASEk}/hv_k G_k Bo) + (1/G_k) \quad (k=1 \sim n)$$

In the above equation, h is Planck's constant; $v_k(k=1 \sim n)$ are signal light frequencies of the light pulses; $G_k(k=1 \sim n)$ are gains at the wavelengths $\lambda_k(k=1 \sim n)$ of the optical amplifier; and Bo is a band width of a pass band of the instrument used for measuring the powers $P_{ASE1} \sim P_{ASEn}$.

The present invention further provides a method for measuring noise figures of an optical amplifier, comprising the steps of generating a modulation clock having a period which is shorter than a time constant of extinction of the optical amplifier, generating a continuous wave light which has a wavelength $\lambda_1$, generating light pulses which have a wavelength $\lambda_n$ and the amplitude is modulated by the modulation clock, supplying the continuous wave light and the light pulse to the optical amplifier, supplying the output light of the optical amplifier to an instrument for distinctively measuring powers of spectrums contained in the supplied input light through an optical switch, changing the wavelength $\lambda_n$ of the light pulses and switching the optical switch in synchronization with the modulation clock so that power $PAMP_n$ at the wavelengths $\lambda_n$ of an amplified light which corresponds to the light pulse and a power $P_{ASEn}$ at the wavelengths $\lambda_n$ of a light which is outputted when the amplified light is not outputted from the optical amplifier are measured by the instrument, and calculating noise figures $NF_n$ at a plurality of wavelengths $\lambda_n$ of the optical amplifier as described below.

$$NF_n = (P_{ASEn}/hv_n G_n Bo) + (1/G_n)$$

In the above equation, h is Planck's constant; $v_n$ is light frequency of the light pulse; $G_n$ is a gain at the wavelength $\lambda_n$ of the optical amplifier; and Bo is a band width of a pass band of the instrument used for measuring the power $P_{ASEn}$.

The present invention further provides a device for measuring noise figures of an optical amplifier, comprising light pulse supplying means for generating light pulses which have different wavelengths $\lambda_1 \sim \lambda_n$ and have a period shorter than a time constant of extinction of the optical amplifier and for supplying the light pulses to the optical amplifier, and light power measuring means for distinctively measuring powers $P_{AMP1} \sim P_{AMPn}$ of amplified lights outputted from the optical amplifier which correspond to the light pulses and have the wavelength $\lambda_1 \sim \lambda_n$ and powers $P_{ASE1} \sim P_{ASEn}$ of lights which have the wavelengths $\lambda_1 \sim \lambda_n$ and are outputted from the optical amplifier when the amplified lights are not outputted from the optical amplifier.

According to the present invention, noise figures of optical amplifiers, used for wavelength division multiplex light communication, can be automatically and accurately measured. Therefore, inspection of optical amplifiers which are produced or supplied by a manufacturer, or evaluation for secular change of optical amplifiers is easily and accurately carried out.

BRIEF DESCRIPTION OF THE DRAWINGS

FIGS. 2A~2E, 3A and 3B show the waveforms of signals generated in the noise figure measuring device shown in FIG. 1.

FIG. 15 shows a conventional method for measuring the noise figure of an optical amplifier.

DETAILED DESCRIPTION OF THE PREFERRED EMBODIMENTS

Figure 1:
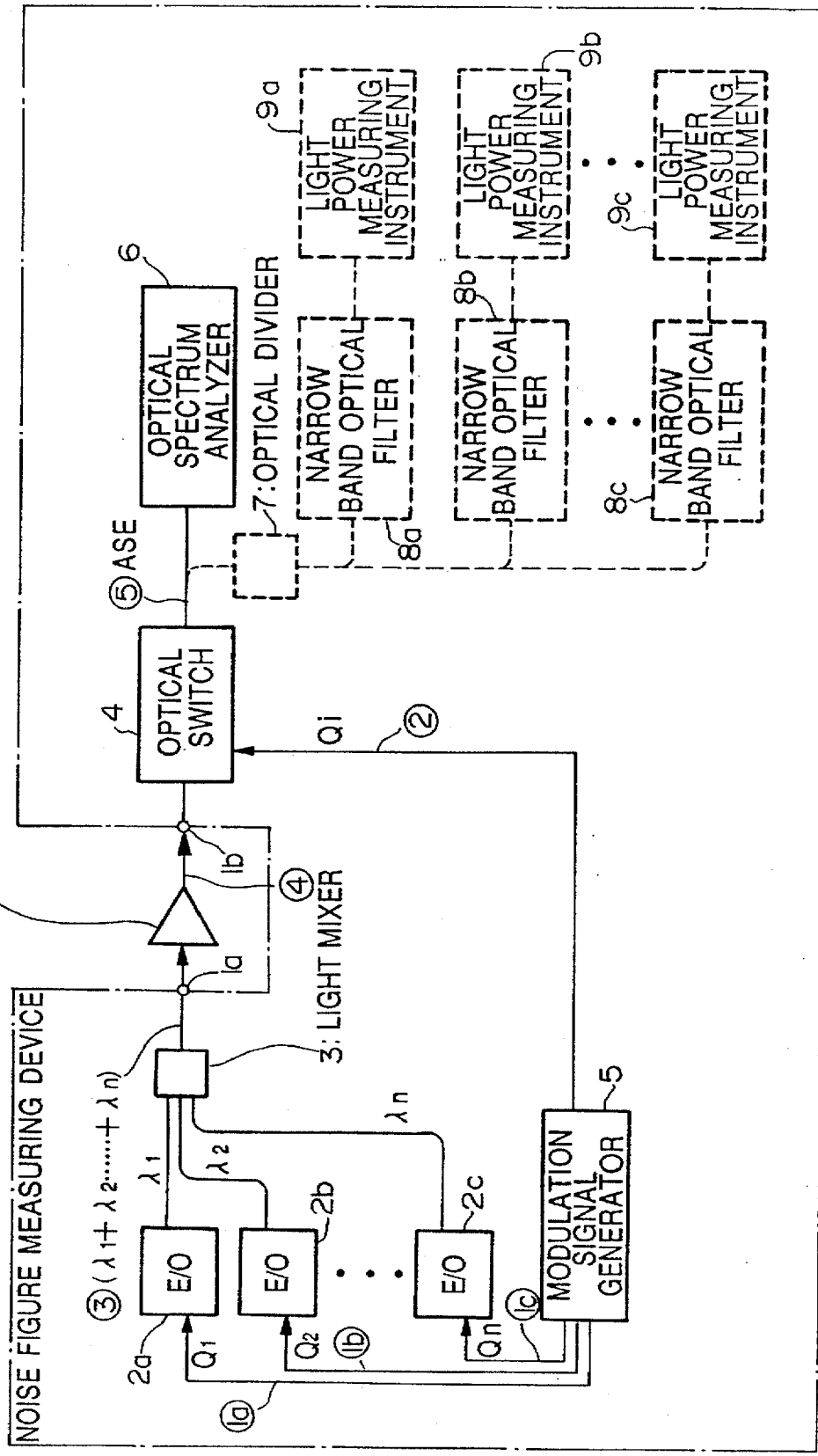
FIG. 1 is a block diagram showing the configuration of a noise figure measuring device according to a first preferred embodiment of the present invention.

Hereinbelow, preferred embodiments of the present invention will be explained with reference to the Figures.

A. Principle of Noise Figure Measuring Method According to the Present Invention As has already been described, when an input signal light containing different wavelength spectrums is amplified by an optical amplifier, the output light containing the amplified signal light and the ASE light is emitted from the optical amplifier and is observed by a spectrum analyzer.

Suppose a case exists in which amplitude modulation is carried out on the input signal light based on periodic pulses and the light pulses generated by the amplitude modulation are inputted to the optical amplifier.

In this case, the output light of the optical amplifier contains the amplified signal lights, which correspond to the light pulses, and the ASE light.

In the output light, the amplified signal lights periodically appear at the period of the above periodical pulses. The ASE light is outputted from the optical amplifier when the amplified signal light is not outputted. During each period in which no amplified signal light is outputted, the power of the ASE light outputted by the amplifier is gradually attenuated according to a extinction time constant and before long the ASE light becomes extinct.

In the case where the optical amplifier is an erbium-doped optical fiber amplifier, the extinction time constant is determined based on the duration of an atom remaining in an excited state. In the case where the optical amplifier is a semiconductor device (for example, a semiconductor laser device), the extinction time constant is determined based of the life time of the carriers in the semiconductor.

The noise figure measuring method according to the present invention is a method to cause this phenomenon, and to measure the power of the ASE light emitted through the phenomenon, and to calculate the noise figure based on the measured ASE power.

In the noise figure measuring method according to the present invention, light pulses are inputted to the optical amplifier at short periods which are all shorter than the above-described extinction time constant of the optical amplifier. As a result, the amplified signal light is outputted from the optical amplifier in response to the light pulse and the ASE light is outputted together with the amplified signal light. Furthermore, the ASE light is outputted from the optical amplifier when the amplified signal light is not outputted. That is to say, the ASE light is continuously outputted from the optical amplifier.

In this method, a light power measuring instrument is used for analyzing the output light of the optical amplifier and an optical switch is inserted between the output terminal of the optical amplifier and the light power measuring instrument. This optical switch is switched in synchronization with the modulation clock so that the output light of the optical amplifier is supplied to the light power measuring instrument when no amplified signal light is outputted from the amplifier. Under this control, the output light consisting of the ASE light is supplied to the light power measuring instrument and the powers of the spectrums of the ASE light are analyzed independent of the amplified signal light.

In the case where a plurality of signal lights having different wavelengths $\lambda_1 \sim \lambda_n$ are generated and the wavelength division multiplex signal light containing these signal lights is inputted to the optical amplifier, the spectrums corresponding to the wavelengths $\lambda_1 \sim \lambda_n$ are detected from the output light of the optical amplifier. In the method according to the present invention, the light power $P_{ASEk}$ (k=1 to n) respectively corresponding to these spectrums are measured and the noise figure NFk(k=1 to n) corresponding to the wavelengths $\lambda_1 \sim \lambda_n$ are determined based on the measured light powers.

In order to measure the light powers $P_{ASEk}$(k=1~n), a plurality of narrow band pass optical filters and a plurality of light power measuring instruments may be used instead of the spectrum analyzer. In this configuration, the filters have different pass bands and the middle wavelengths of the pass bands are $\lambda_1 \sim \lambda_n$.

An automatic noise figure measuring system is constructed according to the present invention. In the system, a calculating device such as a computer is connected to the means for measuring the ASE light powers $P_{ASEk}$(k=1 to n). A program for calculating the noise figure is installed in this computer. Communication between the computer and the means for measuring the ASE light power is carried out via an exclusive interface in a real-time manner. In this system, the noise figures corresponding the wavelengths used in the wavelength division multiplex amplification are automatically and continuously calculated.

The measurements of the ASE light powers $P_{ASEk}$(k=1~n) may be stored in a storage means such as a flexible disk and the measurements may be supplied to the computer to calculate the noise figures.

The method according to the present invention is premised on the condition that the level of the ASE light which is outputted when the amplified signal light is outputted equals to the level of the ASE light which is outputted when the amplified signal light is not outputted.

In order to equalize the levels of the above ASE lights, it is necessary to optimize the period of the input light pulses.

In the case where the optical amplifier is an erbium-doped optical fiber amplifier, the period of the input light pulses must be shorter than the duration of excitation of atoms in the medium of the amplifier.

In the case where the optical amplifier is a semiconductor laser, the period of the input light pulses must be shorter than the carrier life time of the laser.

Under these settings, the levels of the ASE lights can be equalized so as to have no effect upon the measurement of the ASE light powers.

B. First Embodiment of the Present Invention

FIG. 1 is a block diagram showing the overall structure of a noise figure measuring device for measuring noise figures of wavelength division multiplex light amplification according to a first preferred embodiment of the present invention. In FIG. 1, 1 designates an optical amplifier, the noise figures of which are to be measured. 1a designates an input terminal of the optical amplifier 1 and 1b designates an output terminal of the optical amplifier.

First, the description will be given with respect to the outline of the noise figure measuring device. In the noise figure measuring device, an amplitude modulation using a modulation clock is carried out on a continuous light and light pulses generated by the amplitude modulation are sequentially inputted to the optical amplifier 1 in order to emit a continuous ASE light from the amplifier. The optical amplifier 1 is an erbium-doped optical fiber amplifier and the atom life time $\tau_{2ef}$ of the amplifier is about 0.2 to several ten milli-second. Therefore, about 10 kHz of the modulation frequency is enough to emit a continuous ASE light. In this embodiment, the frequency of the modulation clock is 1 MHz.

If the gains of the optical amplifier 1 at the wavelengths $\lambda_k$(k=1~n) are $G_k$(k=1~n) and the band width of the light power measuring instrument for measuring the powers $P_{ASEk}$(k=1~n) of the ASE light, which is outputted when the amplitude signal light is not outputted, is Bo, the noise figures $NF_k$(k=1~n) of the wavelength division multiplex amplification are determined according to the above-described equation (1).

In order to separate the ASE light power $P_{ASEk}$(k=1~n) from the powers $P_{AMPk}$(k=1~n) of the amplified signal light, the measuring timing of the output light of the optical amplifier 1 is controlled by the modulation clock.

In order to distinctively measure the ASE light powers $P_{ASEk}$(k=1 to n), narrow band-pass optical filters and light power measuring instruments are provided.

In this configuration, the narrow band-pass filters have different pass bands and the middle wavelengths of the pass bands are $\lambda_k$(k=1 to n). The gains of the light power measuring instruments are $B_o$.

The powers of the input signal lights which constitute the wavelength division multiplex signal light and have wavelengths $\lambda_k$(k=1~n) are $P_{INPUTk}$(k=1~n). The gains $G_k$(k=1~n) are determined according to the following equation.

$$G_k = (P_{AMPk} - P_{ASEk})/P_{INPUTk} \qquad (2)$$

Next, the detailed description will be given with respect to the configuration of the noise figure measuring device.

In FIG. 1, 2a~2c designate E/O (Electric signal/Optical signal) transducer which output signal lights having different wavelengths $\lambda_1$~$\lambda_n$ 3 designates a light mixer which mixes the output lights of the E/O transducers 2a~2c and supplies the mixed signal light to the input terminal 1a of the optical amplifier 1.

4 designates an optical switch which is connected to the output terminal 1b of the optical amplifier 1. An acousto-optic device is used as the optical switch 1.

5 designates a modulation signal generator which generates modulation clocks $Q_1$~$Q_n$ and a control signal The modulation clocks $Q_1$~$Q_n$ have the same waveforms and the frequency of 1 MHz as described above. The modulation clocks $Q_{1-Qn}$ respectively supplied to the E/O transducers 2a~2c to modulate the amplitudes of the output light of the E/O transducers.

The control signal Qi is generated in synchronization with the generation of the modulation clocks $Q_1$~$Q_n$ and the phase of the control signal is shifted from the phases of the modulation clocks by 180°.

The ON/OFF state of the optical switch 4 is controlled based on the control signal Qi. More specifically, the optical switch 4 is switched to an ON-state by the control signal Qi when the amplified signal light is not outputted from the optical amplifier 1 and the optical switch 4 remains in an ON-state while the control signal Qi is activated. Guard times are provided between the periods in which the amplified signal light is outputted from the optical amplifier 1 and the periods in which the optical switch 4 is in an ON-state. The detailed description of the guard times will be given later.

6 designates an optical spectrum analyzer which analyzes the spectrums of the output light of the optical amplifier 1 supplied through the optical switch 4.

In FIG. 1, elements 7, 8a~8c and 9a~9c are illustrated by dotted lines. Instead of the optical spectrum analyzer 6, these elements may be used to analyze the spectrums of the output light of the optical amplifier 1.

7 designates an optical divider which divides the output light of the optical amplifier 1 supplied through the optical switch 4.

8a~8c designate narrow band optical filters which have different pass bands. The middle wavelengths of the pass bands are respectively $\lambda_1$~$\lambda_n$. The divided lights emitted from the optical divider 7 are supplied to the narrow band optical filters 8a~8c.

9a~9c designate light power measuring instruments which respectively measure the powers $P_{ASE1}$~$P_{ASEn}$ of the ASE lights which are outputted from the narrow band optical filters 8a~8c and have the wavelengths $\lambda_1$~$\lambda_n$.

Next, the description will be given with respect to the operation of the noise figure measuring device.

The modulation clocks $Q_1$~$Q_n$ and the control signal Qi are generated by the modulation signal generator 5. The modulation clocks $Q_1$~$Q_n$ thus generated are respectively supplied to the E/O transducers 2a~2c. The control signal Qi thus generated is supplied to the optical switch 4.

The E/O transducers 2a~2c respectively outputs the light pulses which have the wavelength $\lambda_1$~$\lambda_n$ in synchronization with the modulation clocks $Q_1$~$Q_n$.

The light pulses thus outputted are mixed by the light mixer 3 and the wavelength division multiplex signal light is outputted from the light mixer.

The wavelength division multiplex signal light is supplied to the optical amplifier 1. As a result, the output light is emitted from the optical amplifier 1. As described above, this output light contains the amplified wavelength division multiplex signal light and the ASE light.

The output light of the optical amplifier 1 is supplied to the optical switch 4. The optical switch 4 is switched to the ON-state by the control signal Qi when the amplified signal light is not outputted from the optical amplifier 1. Therefore, the output light containing the amplified signal light is blocked by the optical switch 4 and the output light which does not contain the amplified signal light but contains the ASE light is outputted through the optical switch 4.

The output light which pass through the optical switch 4 is supplied to the optical spectrum analyzer 6. The optical analyzer 6 detects the powers $P_{ASE1}$~$P_{ASEn}$ of the ASE lights contained in the output light of the optical switch 4.

In this manner, under the switching control by the optical switch 4, the powers $P_{ASE1}$~$P_{ASEn}$ of the ASE light are separated from the powers $P_{AMP1}$~$P_{AMPn}$ of the amplified signal light and the ASE light powers are measured independent of the powers of the amplified signal lights.

FIGS. 2A~2C shows waveforms of the signals generated in the noise figure measuring device. More specifically, FIG. 2A shows the waveform of each one of the modulation clocks $Q_1$~$Q_n$. FIG. 2B shows the waveform of the control signal Qi. FIG. 2C shows the waveform of the wavelength division multiplex signal light supplied to the optical amplifier 1. FIG. 2D shows the waveform of the output light of the optical amplifier 1. FIG. 2E shows the waveform of the output light of the optical switch 4.

As shown in FIG. 2D, the output light of the optical amplifier 1 contains the amplified signal light and the ASE light. But, the amplified signal light is blocked by the optical switch 4 and only the ASE light is supplied to the optical spectrum analyzer 6 through the optical switch 4. Therefore, it is possible to observe the spectrums of the ASE light independent of the amplified signal light.

Furthermore, the phase of the control signal Qi may be changed so that the optical switch 6 turns into the ON-state when the output light containing the amplified signal light is outputted from the optical amplifier 1. In this case, it is possible to calculate the gains of the optical amplifier 1 at wavelengths $\lambda_1$~$\lambda_n$ based on the powers $P_{AMP1}$~$P_{AMPn}$ of the amplified signal lights at the respective wavelengths which are detected by the optical spectrum analyzer 6.

Meanwhile, the phase of the control signal Qi should be accurately shifted from the phases of the modulation clocks $Q_1$~$Q_n$ by 180°. However, there is a case in which the control signal Qi is not accurately synchronized to the modulation clocks or a ease in which the control signal and the modulation clocks overlap. This causes a disadvantage that the amplified signal light is leaked into the output light of the optical switch 6. FIG. 3A shows the example of the disadvantage in which the performance in the ON-state of the optical switch 1 is too long and a portion of the amplified signal light outputted from the optical amplifier 1 is leaked into the output light of the optical switch 6. In this case, it is difficult to accurately measure the power $P_{ASE1}$~$P_{ASEn}$ of the ASE lights independent of the amplified signal light.

In the preferred embodiment, guard times G are provided between the output timing of the amplified signal light and the periods in which the optical switch 6 remains in the ON-state to block the leakage of the amplified signal light. FIG. 3B shows an example of the waveform of the control signal Qi to block the leakage. In this example, the performance in the ON-state of the optical switch 6 is reduced to less than 50% to block the leakage. In this manner, it is possible to block the leakage of the amplified signal light and to accurately measure the ASE light power.

As described above, in the first preferred embodiment, the wavelength division multiplex signal light, which contains the components having different wavelengths and are modulated by the modulation clocks, the periods of which are shorter than the extinction time constant of the optical amplifier 1, is supplied to the optical amplifier 1 and the output light of the optical amplifier 1 which does not contain the amplified signal light is extracted by the optical switch 4 to supply only the ASE light to the optical spectrum analyzer 6. Therefore, it is possible to accurately measure the power $P_{ASE1}$~$P_{ASEn}$ of the ASE light at the respective wavelengths independent of the amplified signal light.

Variable wavelength E/O transducers are preferable as the E/O transducers 2a~2c. In this configuration, the wavelengths of the output light of the E/O transducers can be controlled. Therefore, it is possible to determine the noise figures at desired wavelengths.

C. Second Preferred Embodiment

Figure 4:
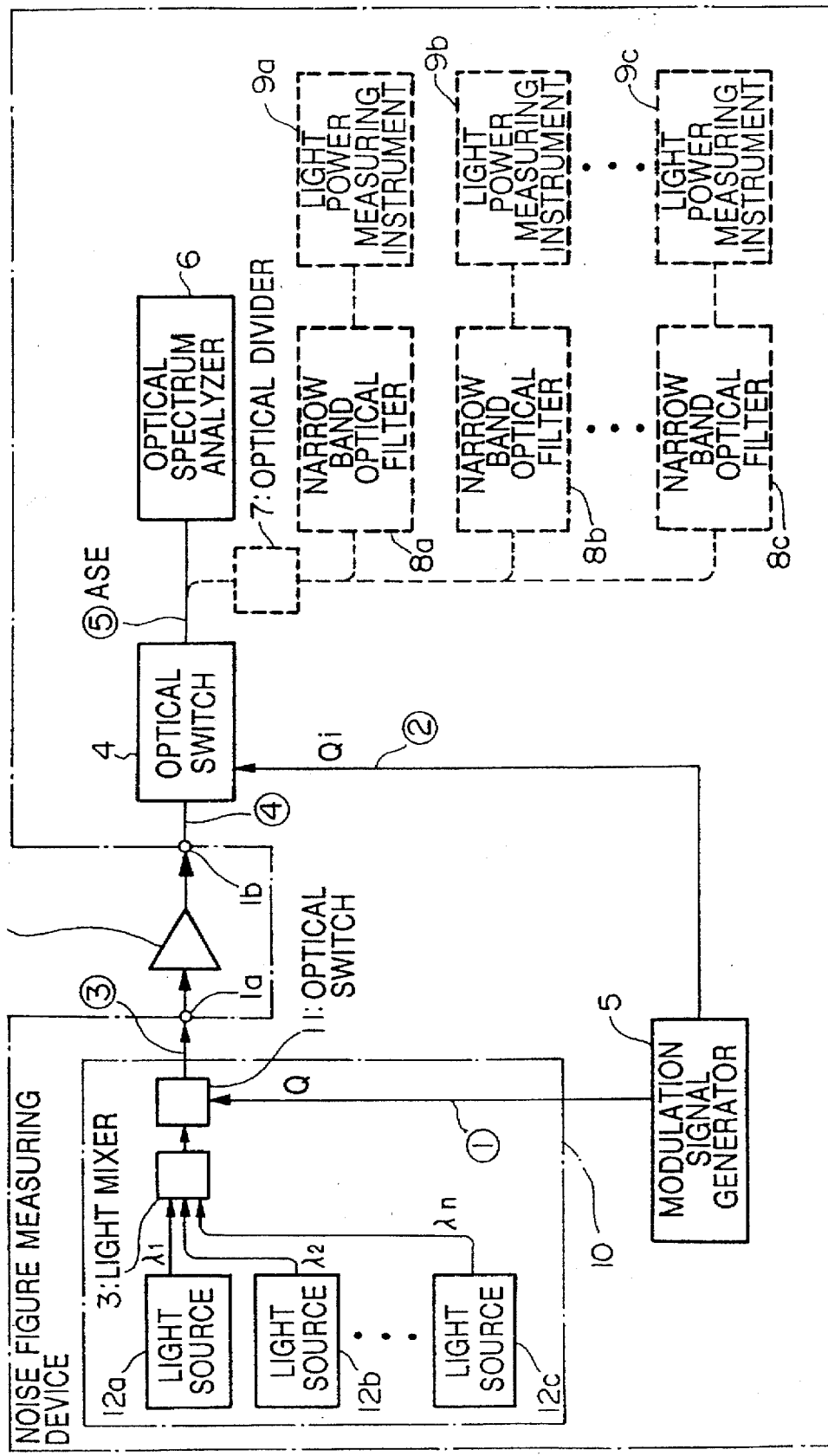
FIG. 4 is a block diagram showing the configuration of a noise figure measuring device according to a second preferred embodiment of the present invention.

FIG. 4 is a block diagram showing the configuration of a noise figure measuring device for wavelength division multiplex amplification according to a second preferred embodiment of the present invention. The members which are identical to those of the first preferred embodiment shown in FIG. 1 are designated by the same reference numerals as of the first preferred embodiment, and therefore a description thereof will be omitted.

In the second preferred embodiment, a plurality of light sources 12a~12c are provided instead of the E/O transducers 2a~2c of the first preferred embodiment. These light sources 12a~12c emit continuous lights having different wavelengths $\lambda_1$~$\lambda_n$. The output lights of the light sources 12a~12c are mixed by the light mixer 3 and the wavelength division multiplex signal light is outputted from the light mixer 3. An optical switch 11 is provided for generating light pulses based on the wavelength division multiplex signal light. A modulation clock Q is supplied to the optical switch 11 by the modulation signal generator 5. The optical switch 11 is switched to an ON-state by the modulation clock Q. As a result, light pulses are outputted from the optical switch 11. The light pulses thus outputted are amplified by the optical amplifier 1 and the amplified signal light is outputted from the optical amplifier 1.

The optical switch 11 is constructed of a plurality of acousto-optic devices connected in a cascade and the acousto-optic device is also used for the optical switch 4. The reason why the acousto-optic devices are connected in a cascade will be described later.

The modulation signal generator 5 further supplies a control signal Qi to the optical switch 4. The phase of the control signal Qi is shifted from the phase of the modulation clock Q. The optical switch 4 is switched to ON-state by the control signal Qi when the amplified signal light is not outputted from the optical amplifier 1 but only the ASE light is outputted from the optical amplifier. Therefore, the amplified signal light is blocked by the optical switch 4 and only the ASE light passes through the optical switch 4.

Figure 5:
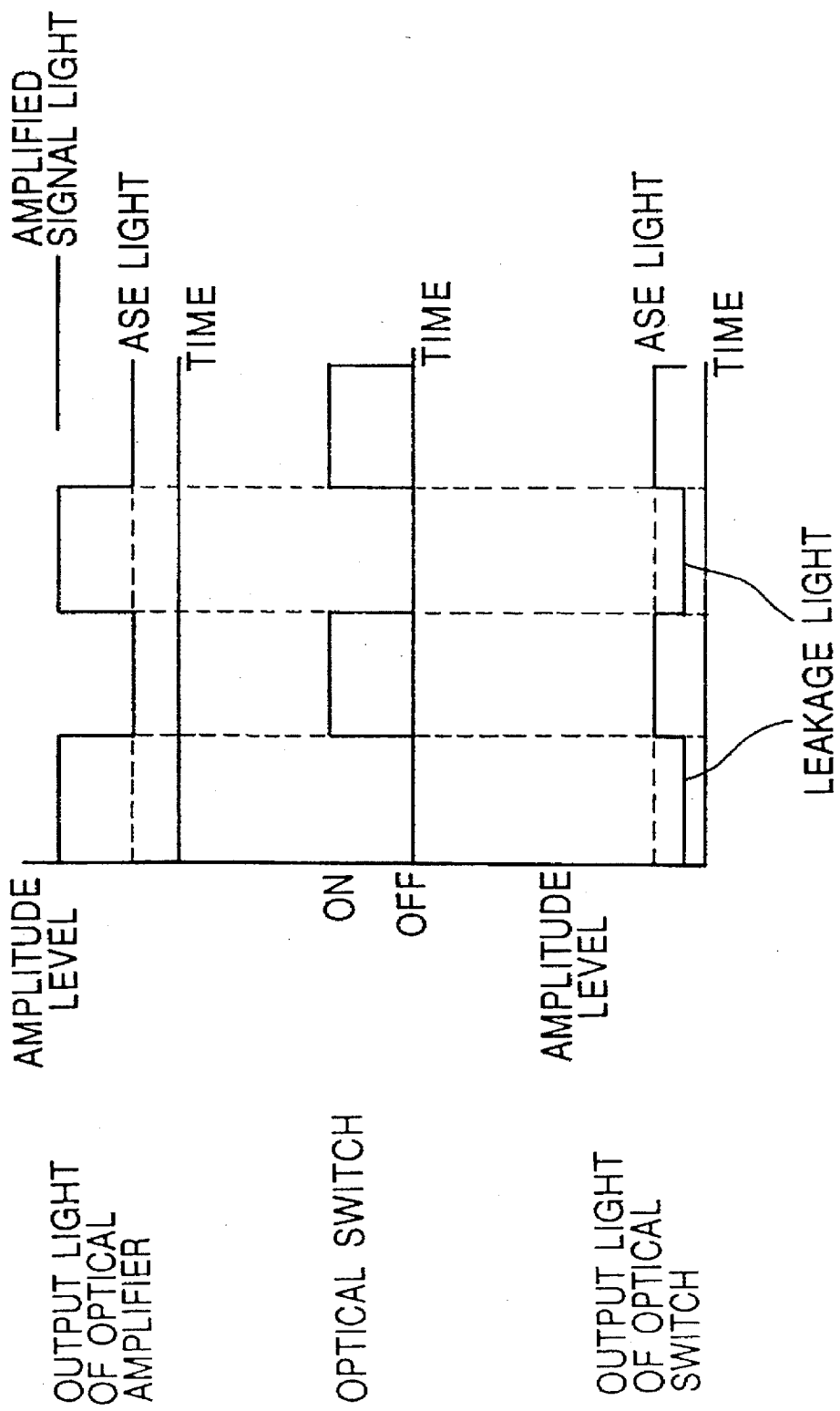
FIG. 5 shows the waveforms of signals generated in the noise figure measuring device shown in FIG. 4.

In the case where the optical switch 4 has low resistance to cross-talk and the amplified signal light outputted from the optical amplifier 1 is not perfectly blocked, a portion of the amplified signal light outputted from the optical amplifier 1 may be leaked into the output light of the optical switch 4 as shown in FIG. 5. In this case, measuring errors are generated in the measurement of the ASE light powers $P_{ASE1}$~$P_{ASEn}$ corresponding to the wavelengths $\lambda_1$~$\lambda_n$.

However, in the second preferred embodiment, the acousto-optic devices are used as the optical switches. The suppression ratio to leakage light of an acousto-optic device is about 20~40 dB. Therefore, if each optical switch is made up of two acousto-optic devices connected in a cascade, the suppression ratio to leakage light of the optical switch is improved to 40~80 dB. Furthermore, if two acousto-optic devices of the optical switch are arranged so that the planes of the polarization of the devices cross at a right angle, the characteristics of the devices dependent on the planes of polarization thereof cancel each other. Therefore, in the case where the optical switches 4 and 11 are made up of two acousto-optic devices connected in a cascade, it is possible to accurately measure the noise figures $NF_1$~$NF_n$ for the wavelength division multiplex amplification.

D. Third Preferred Embodiment

Figure 6:
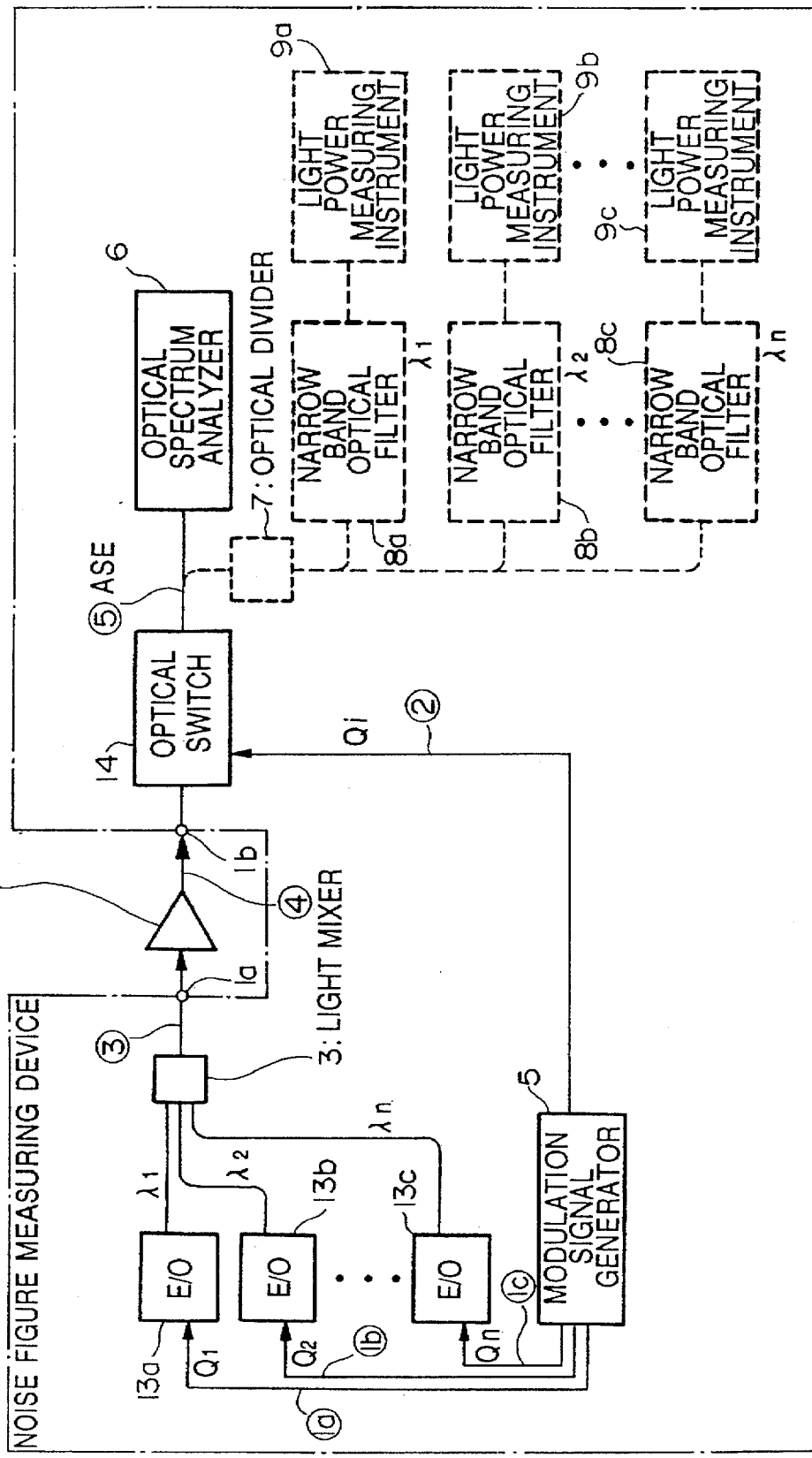
FIG. 6 is a block diagram showing the configuration of a noise figure measuring device according to a third preferred embodiment of the present invention.

FIG. 6 is a block diagram showing the configuration of a noise figure measuring device for wavelength division multiplex amplification according to a third preferred embodiment of the present invention. The members which are identical to those of the first preferred embodiment shown in FIG. 1 are designated by the same reference numerals as of the first preferred embodiment and then the description thereof will be omitted.

In the above-described first and second preferred embodiments, noise figures of an erbium-doped optical fiber amplifier is measured. In contrast, the noise figure measuring device according to the third preferred embodiment measures the noise figures of a semiconductor optical amplifier 50 shown in FIG. 6. Generally, time constants of extinction of semiconductor optical amplifiers are very short. Therefore, light pulses are supplied to the semiconductor optical amplifier 50 at a higher frequency of more than 1 GHz.

More specifically, the atom life time $\tau_{2eff}$ of the semiconductor optical amplifier 50 is less than several nanosecond.

Therefore, the modulation frequency for generating the input pulses which are to be the supplied to the semiconductor optical amplifier 50, should be more than several GHz.

In order to generate such high rate light pulses, E/O transducers 13a~13c are provided instead of the E/O transducers 2a~2c. The E/O transducers 13a~13c respectively have semiconductor lasers which generate CW (Continuous Wave) lights having different wavelengths at constant light powers and photomodulators for modulating the CW lights according to the modulation clocks $Q_1$~$Q_n$ supplied from the modulation signal generator 5. The modulation clocks $Q_1$18 $Q_n$ have a high frequency, for example, 10 GHz. In order to modulate the CW light at such a high frequency, it is necessary to employ high-speed type phototransducers as the modulators of the E/O transducers 13a~13c. Therefore, $LiNbO_3$ photomodulators or extinction type photomodulators, which can operate at higher frequencies of more than several tens of GHz, are employed in the E/O transducers 13a~13c as the modulators.

The other members except for the E/O transducers 13a~13c are the same as those of the first preferred embodiment.

In this third preferred embodiment, it is possible to accurately measure the noise figures $NF_1$~$NF_n$ of the semiconductor optical amplifier 50 which amplifies the wavelength division multiplex signal light.

E. Fourth Preferred Embodiment

Generally, erbium-doped optical fibers are produced by doping erbium in the cores of single-mode optical fibers, the transmission characteristics of which are independent of the planes of polarization of the input light.

Therefore, if light is inputted to an erbium-doped optical fiber for exciting the optical fiber and amplification phenomenon is thereby caused in the optical fiber, the amplification thus caused is independent of the plane of polarization of the input light.

There are optical isolators or optical filters, the characteristics of which are independent of the plane of polarization of light. Therefore, it is possible to constitute an erbium-doped optical fiber amplifier, the characteristics of which are independent of the plane of polarization of the input light, by combinating an erbium-doped optical fiber and this type of optical isolator or of optical filter. Research and development is being vigorously carried out at present to produce such an erbium-doped optical fiber amplifier.

On the other hand, there are other types of optical amplifiers, the amplification characteristics of which are dependent of the plane of polarization of the input light.

For example, there are optical fibers such as PANDA optical fibers, the transmission characteristics of which are dependent of the plane of polarization of the input light. If erbium is doped in the core of this type of optical fiber, it is possible to produce an erbium-doped optical fiber amplifier, the amplification characteristics of which are dependent of the plane of polarization of the input light.

In production of semiconductor laser amplifiers, on active layer for amplifying light should be formed so that the thickness and the width of the layer are the same size. However, it is difficult to accurately adjust the width and the thickness of the active layer. Therefore, most semiconductor optical amplifiers produced have amplification characteristics dependent of the plane of polarization of the input light.

In this type of semiconductor optical amplifier, the gain of the amplification and the power of the output light are dependent of the plane of polarization of the input light. Furthermore, the ASE light outputted from the semiconductor optical amplifier is dependent of the plane of polarization of the output surface of the amplifier.

If the wavelength division multiplex amplification is carried out by this type of semiconductor optical amplifier and the noise figures $NF_1$~$NF_n$ of the amplification are to be measured, it is necessary to measure the gains or the ASE light powers which correspond to the plane of polarization of the amplified signal light emitted from the semiconductor optical amplifier.

The noise figure measuring device according to the fourth preferred embodiment is a device for measuring the noise figures of optical amplifiers which have amplification characteristics dependent of the plane of polarization of the input light.

Figure 7:
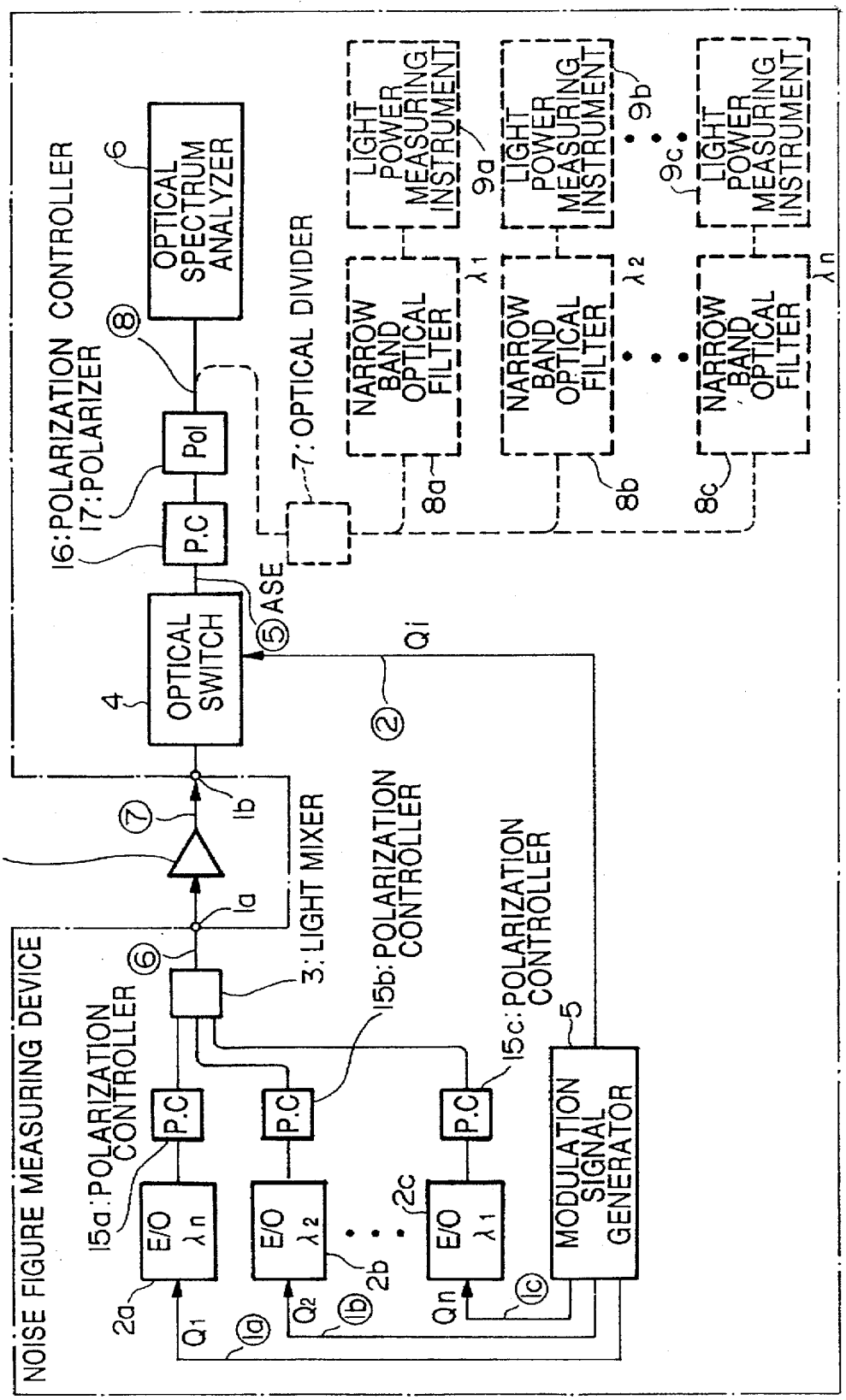
FIG. 7 is a block diagram showing the configuration of a noise figure measuring device according to a fourth preferred embodiment of the present invention.

FIG. 7 is a block diagram showing the configuration of the noise figure measuring device according to the fourth preferred embodiment of the present invention. The members which are identical to those of the first preferred embodiment shown in FIG. 1 are designated by the same reference numerals as of the first preferred embodiment and description thereof will therefore be omitted.

In FIG. 7, polarization controllers 15a~15c are respectively inserted between the output terminals of the E/O transducers 2a~2c and the input terminals of the light mixer 3 in order to make the planes of polarization of the light pulses emitted from the E/O transducers 2a~2c uniform.

The optical amplifier 1 is an erbium-doped optical amplifier, the amplification characteristics of which are dependent on the plane of polarization of the input light. The light pulses outputted from the polarization controllers 15a~15c are mixed by the mixer 3 and the wavelength division multiplex light pulses are inputted to the optical amplifier 1. The output light of the optical amplifier 1 contains the amplified light pulses corresponding to the input light pulses and the other light.

A polarization controller 16 and a polarizer 17 are inserted between the output terminal of the optical amplifier 1 and the input terminal of the spectrum analyzer 6.

The polarization controller 16 and the polarizer 17 constitute a means for extracting a polarized light which has a plane of polarization coincident with that of the amplified signal light from the output light of the optical amplifier 1.

Next, the operation of the fourth preferred embodiment will be described. In this preferred embodiment, the E/O transducers 2a~2c and the optical switch 4 are activated in phase based on the modulation clocks $Q_1$~$Q_n$ generated by the modulation signal generator 5.

When measuring the gains of the optical amplifier 1, the control signal Qi and the modulation clocks are generated in phase. Therefore, the optical switch 4 is switched to an ON-state when the amplified light pulse and the ASE light are outputted from the optical amplifier 1. As a result, the amplified light pulse and the ASE light thus outputted are supplied to the polarization controller 16 through the optical switch 4.

The polarization controller 16 is controlled so that the power of the output light of the polarizer 17 becomes maximum. It is difficult to control the polarization controller 16 so as to minimize the power of the output light of the polarizer 17. However, it is easy to control the polarization controller 16 so as to maximize the power of the output light of the polarizer 17.

Under the control of the polarization controller 16, the polarizer 17 outputs the amplified light containing spectrums having different wavelengths and the ASE light, the plane of polarization of which is coincident with that of the amplified light.

The spectrum analyzer 6 analyzes the powers $P_{AMP1}$~$P_{AMPn}$ of the spectrums corresponding to the wavelengths $\lambda_1$~$\lambda_n$ of the wavelength division multiplex light pulse based on the output light of the polarizer 17. The powers $P_{AMP1}$~$P_{AMPn}$ thus analyzed are revised based on the transmission loss of the polarization controller 16 and the polarizer 17. The gains of the optical amplifier 1 at wavelengths $\lambda_1$~$\lambda_n$ are then calculated based on the revised output powers according to the above-described equation (2).

The operations for measuring the ASE powers and calculating the noise figures are identical to those of the first preferred embodiment. Therefore, the description thereof is omitted.

F. Fifth Preferred Embodiment

Figure 8:
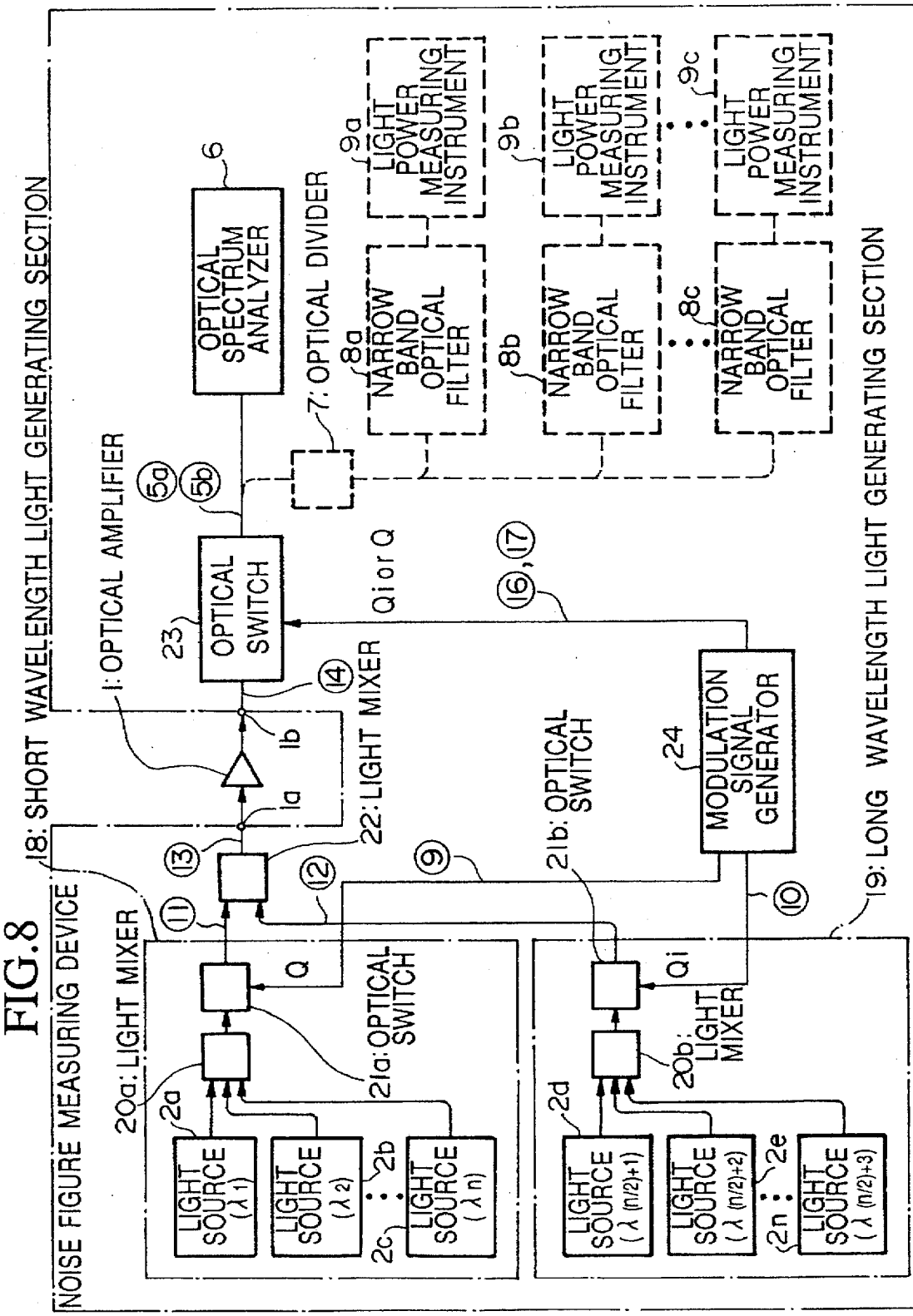
FIG. 8 is a block diagram showing the configuration of a noise figure measuring device according to a fifth preferred embodiment of the present invention.

FIG. 8 is a block diagram showing the configuration of a noise figure measuring device for wavelength division multiplex amplification according to a fifth preferred embodiment of the present invention. The members which are identical to those of the first preferred embodiment shown in FIG. 1 are designated by the same reference numerals as in the first preferred embodiment, and descriptions thereof will therefore be omitted.

A short wavelength light generating section 18 and a long wavelength light generating section 19 are provided in the noise figure measuring device.

The short wavelength light generating section 18 has light sources 2a~2c, a light mixer 20a, and an optical switch 21a. The light sources 2a~2c respectively emit CW lights having short wavelengths $\lambda_1$~$\lambda_{n/2}$. The CW lights are mixed by the light mixer 20a and the wavelength division multiplex CW light is supplied to the optical switch 21a from the optical mixer 20a. The optical switch 21a is switched to ON-state by a modulation clock Q which is supplied from a modulation signal generator 24. A short wavelength division multiplex light pulses consisting of spectrums corresponding to short wavelengths $\lambda_1$~$\lambda_{n/2}$ are outputted from the optical switch 21a in synchronization with the modulation clock Q.

On the other hand, the long wavelength light generating section 19 has light sources 2d~2n, a light mixer 20b and an optical switch 21b. The light sources 2d~2n respectively emit CW lights having long wavelengths $\lambda_{(n/2)+1}$~$\lambda_n$. The CW lights are mixed by the light mixer 20b and the wavelength division multiplex CW light is supplied to the optical switch 21b from the optical mixer 20b. The optical switch 21b is switched to the ON-state by a modulation clock Qi which is supplied from a modulation signal generator 24. The modulation clocks Qi and Q have a same period. But the phase of the modulation clock Qi is shifted from that of the modulation clock Q by 180°. A long wavelength division multiplex light pulses consisting of spectrums corresponding to long wavelengths $\lambda_{(n/2)+1}$~$\lambda_n$ are outputted from the optical switch 21b in synchronization with the modulation clock Qi.

That is to say, the short wavelength division multiplex light pulses and the long wavelength division multiplex light pulses are alternatively generated by the short and long wavelength light generating sections 18 and 19. The short and long wavelength division multiplex light pulses thus generated are alternatively supplied to the optical amplifier 1 through a light mixer 22.

An optical switch 23 is inserted between the output terminal of the optical amplifier 1 and the input terminal of the optical spectrum analyzer 6. The optical switch 23 is switched to an ON-state by the modulation clock Q or Qi.

Figure 9:
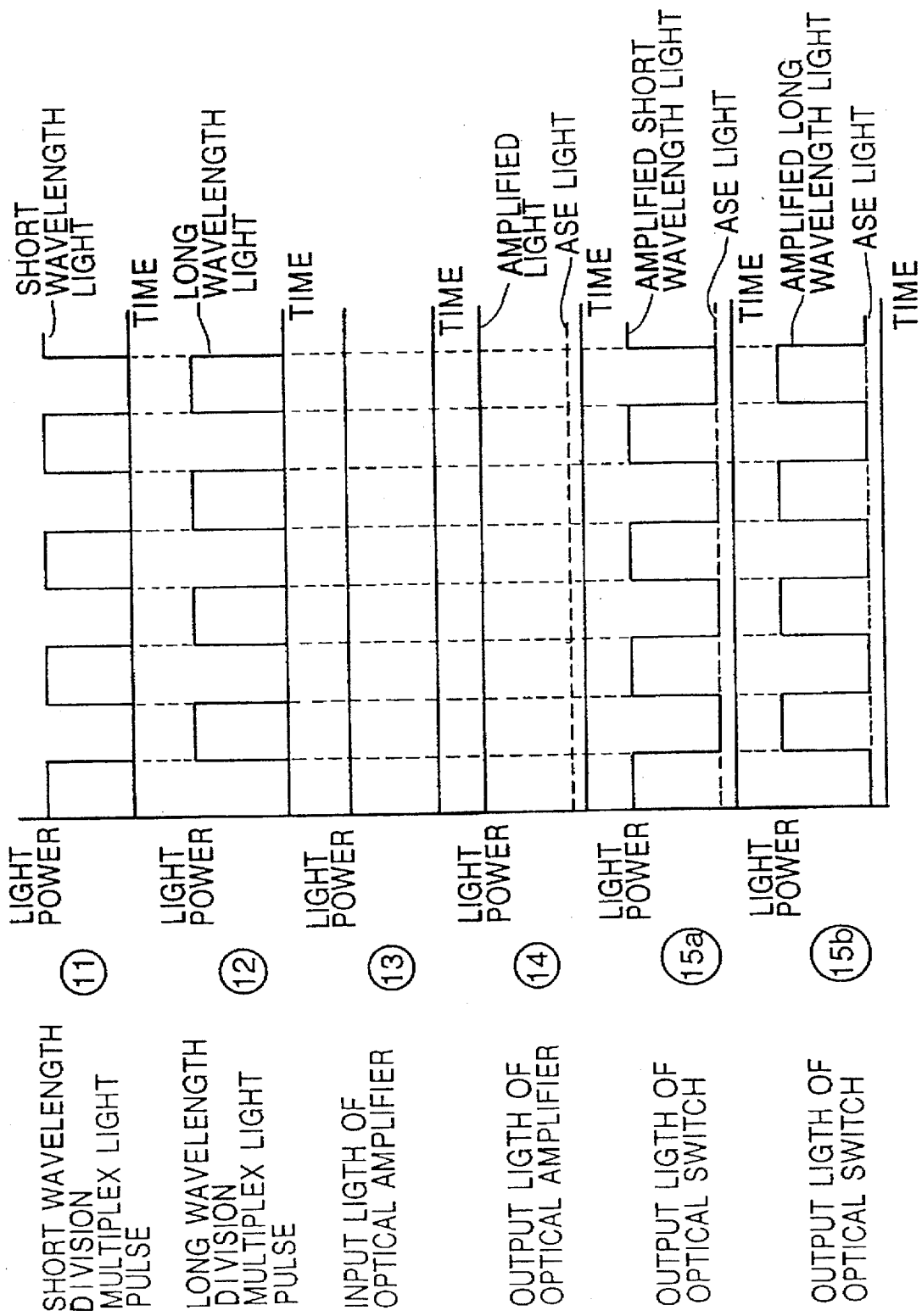
FIG. 9 shows the waveforms of signals generated in the noise figure measuring device shown in FIG. 8.
Figure 10A:
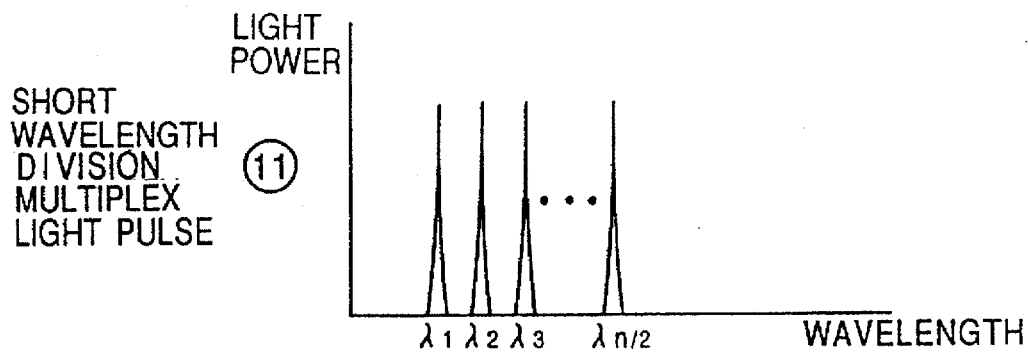
FIGS. 10A~10C and 11A~11C show the spectrums of lights detected by the noise figure measuring device shown in FIG. 8.
Figure 10B:
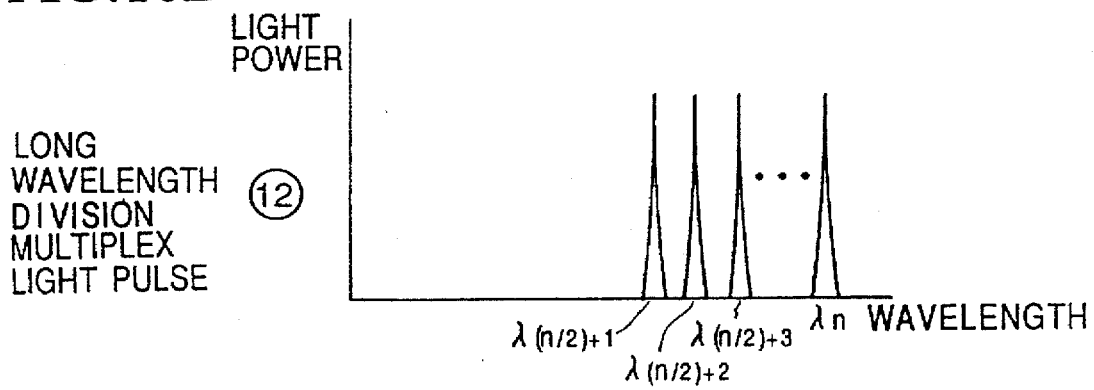
Figure 10C:
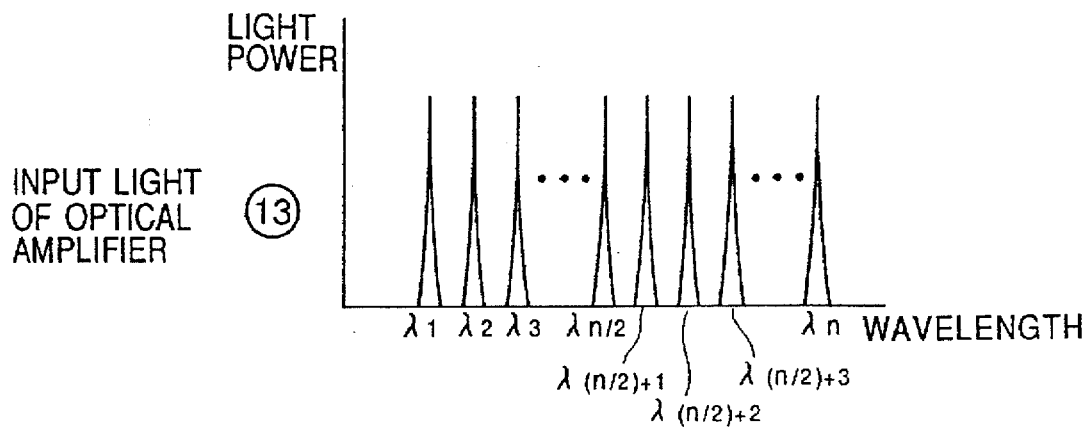
Figure 11A:
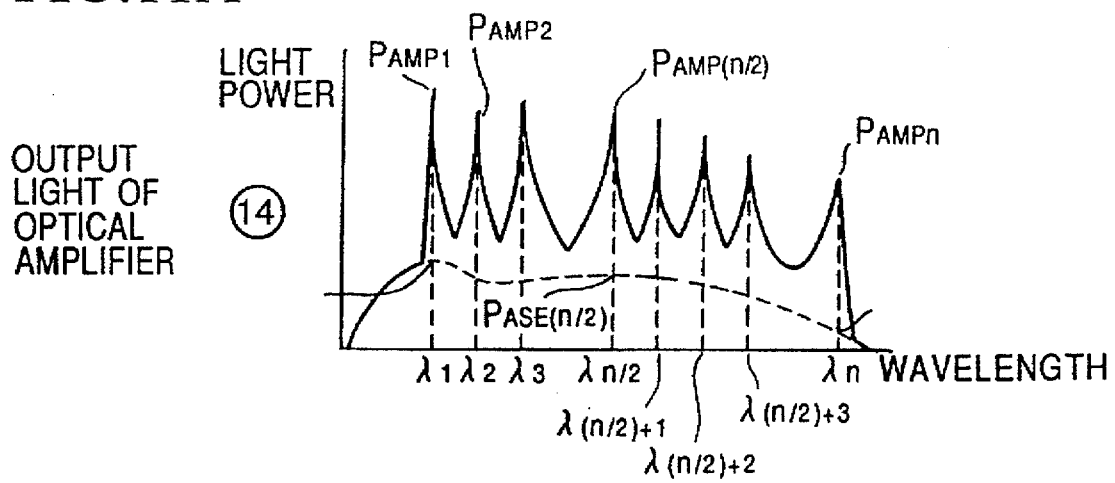
Figure 11B:
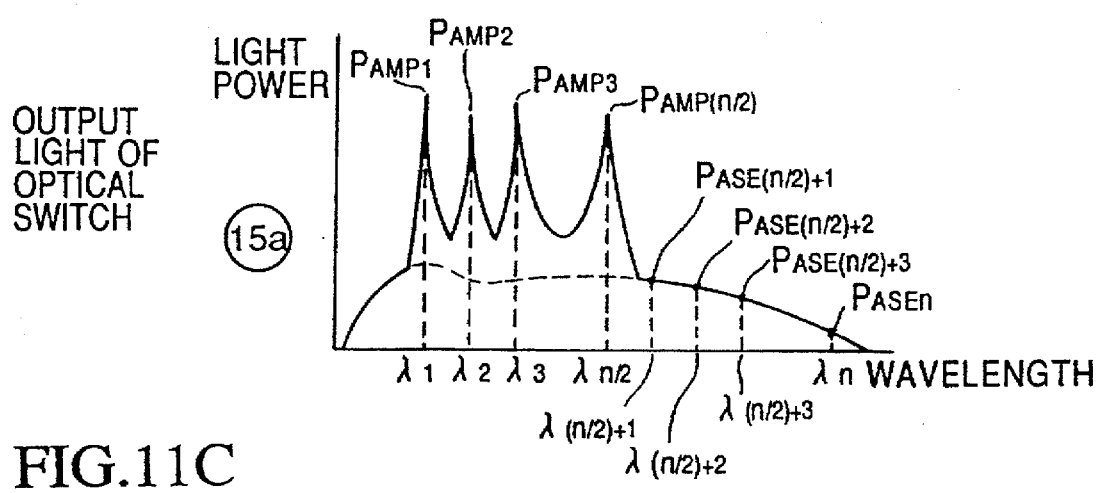
Figure 11C:
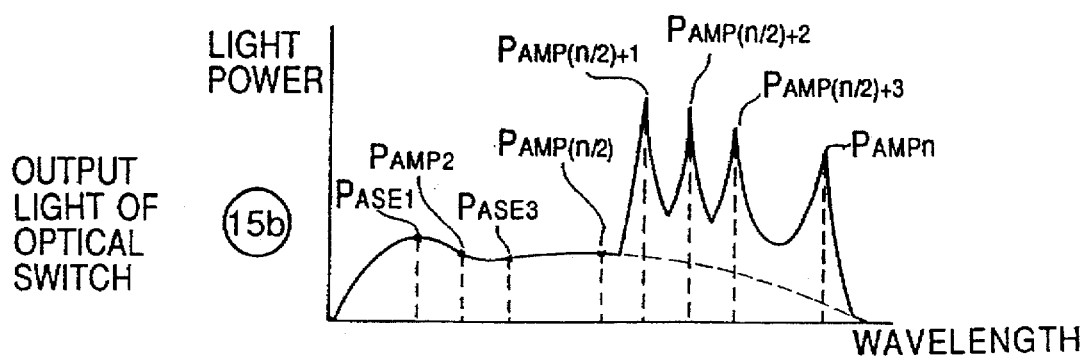

FIG. 9 shows waveforms of the light signals generated in the noise figure measuring device. The operation of the device will be described with reference to FIG. 9.

As described above and as shown in FIG. 9, the short and long wavelength division multiplex light pulses are alternatively generated and the short and long wavelength division multiplex light pulses thus generated are alternatively supplied to the optical amplifier 1 through the light mixer 22 under time division control. That is to say, the continuous wavelength division multiplex light is supplied to the optical amplifier 1 as shown in FIG. 9. As a result, the amplification medium of the optical amplifier 1 continuously remains in a population inversion state. Therefore, the period of the modulation clocks Q and Qi may be longer than the duration of excitation of the atoms or the duration of the carrier.

The amplified wavelength division multiplex lights corresponding to the short wavelength division multiplex light pulses and the amplified wavelength division multiplex lights corresponding to the long wavelength division multiplex light pulses are alternatively outputted from the optical amplifier 1. Furthermore, the ASE lights are outputted from the optical amplifier 1 together with the amplified wavelength division multiplex lights.

In the case where the modulation clock Q is supplied to the optical switch 23, the amplified lights corresponding to the short wavelength division multiplex light pulses and the ASE lights are supplied to the optical spectrum analyzer 6 through the optical switch 23. In the case where the modulation clock Qi is supplied to the optical switch 23, the amplified lights corresponding to the long wavelength division multiplex light pulses and the ASE lights are supplied to the optical spectrum analyzer 6 through the optical switch 23.

FIGS. 10A~10C and 11A~11C show the spectrums of the wavelength division multiplex light generated in the noise figure measuring device.

First, the description will be given with respect to a case in which the modulation clock Q is supplied to the optical switch 23. In this case, when the optical switch 23 is switched to the ON-state by the modulation clock Q, the optical amplifier 1 outputs the amplified wavelength division multiplex light corresponding to the short wavelength division multiplex light pulse outputted from the short wavelength light generating section 18 and the ASE lights corresponding to the long wavelength division multiplex light pulse outputted from the long wavelength light generating section 19.

Therefore, the amplified light consisting of the spectrums having the short wavelengths $\lambda_1$~$\lambda_{n/2}$ and the ASE light consisting of the spectrums having the long wavelengths $\lambda_{(n/2)+1}$~$\lambda_n$ are supplied to the optical spectrum analyzer 6 through the optical switch 23. As a result, the powers $P_{AMP1}$~$P_{AMPn/2}$ of the spectrums having the wavelengths $\lambda_1$~$\lambda_n$ contained in the amplified wavelength division multiplex light and the powers $P_{ASE(n/2)+1}$~$P_{ASEn}$ of the spectrums having the wavelengths $\lambda_{(n/2)+1}$~$\lambda_n$ contained in the ASE light are measured by the optical spectrum analyzer 6.

Next, the description will be given with respect to a case in which the modulation clock Qi is supplied to the optical switch 23. In this case, when the optical switch 23 is switched to the ON-state by the modulation clock Q, the optical amplifier 1 outputs the amplified wavelength division multiplex light corresponding to the long wavelength division multiplex light pulse outputted from the long wavelength light generating section 19 and the ASE lights corresponding to the short wavelength division multiplex light pulse outputted from the short wavelength light generating section 18.

Therefore, the amplified light consisting of the spectrums having the long wavelengths $\lambda_{(n/2)+1}$~$\lambda_n$ and the ASE light consisting of the spectrums having the short wavelengths $\lambda_1$~$\lambda_{n/2}$ are supplied to the optical spectrum analyzer 6 through the optical switch 23. As a result, the powers $P_{AMP(n/2)+1}$~$P_{AMPn}$ of the spectrums having the wavelengths $\lambda_{(n/2)+1}$~$\lambda_n$ contained in the amplified wavelength division multiplex light and the powers $P_{ASE1}$~$P_{ASEn/2}$ of the spectrums having the wavelengths $\lambda_1$~$\lambda_{n/2}$ contained in the ASE light are measured by optical spectrum analyzer 6.

In this manner, the powers $P_{AMP1}$~$P_{AMPn}$ of the amplified light and the powers $P_{ASE1}$~$P_{ASEn}$ of the ASE light are determined. The noise figures at the wavelengths $\lambda_1$~$\lambda_n$ are accurately calculated based on the powers thus determined according to the above-described equation (1).

G. Sixth Preferred Embodiment

Figure 12:
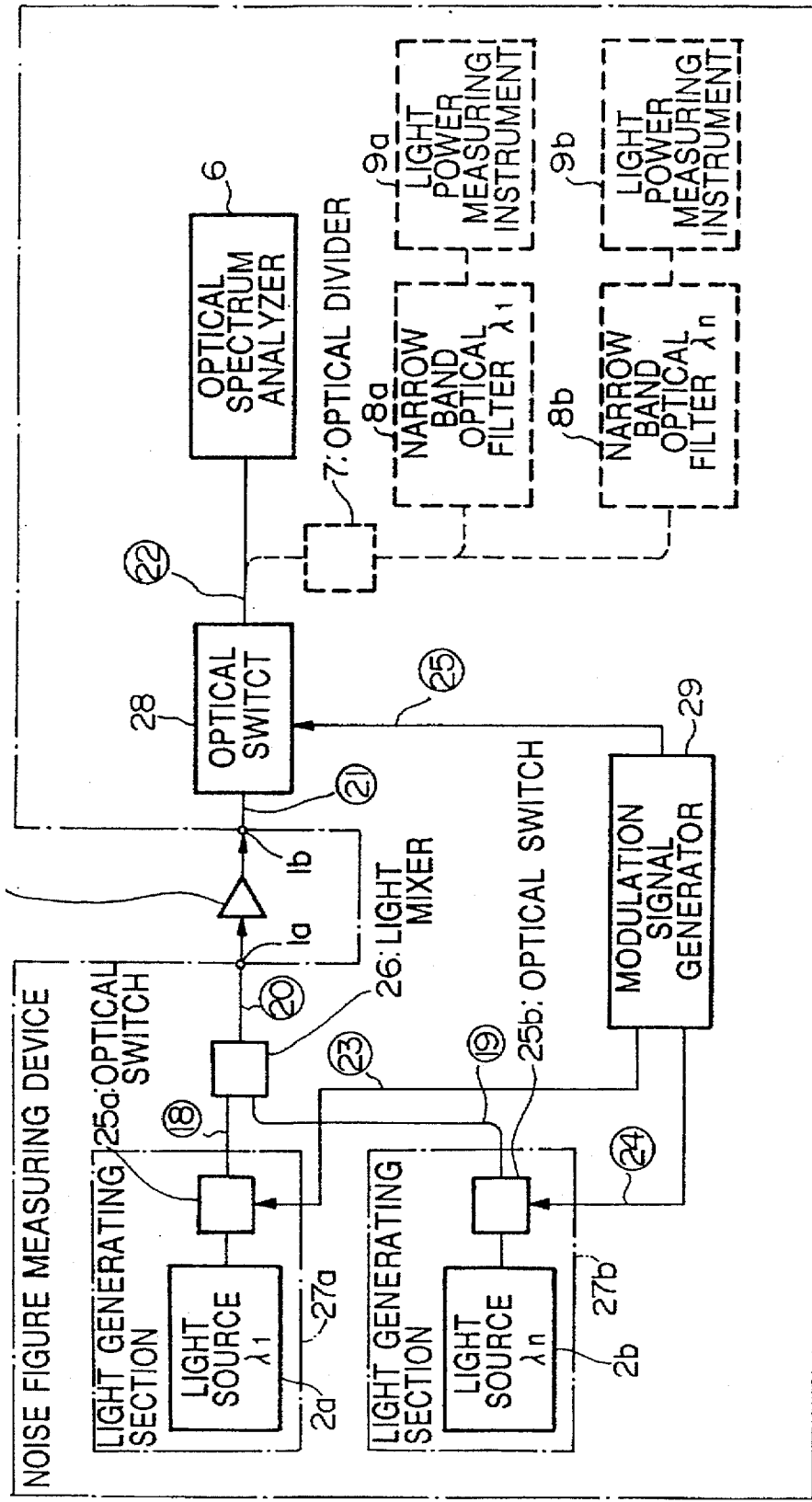
FIG. 12 is a block diagram showing the configuration of a noise figure measuring device according to a sixth preferred embodiment of the present invention.

FIG. 12 is a block diagram showing the configuration of a noise figure measuring device for wavelength division multiplex amplification according to a sixth preferred embodiment of the present invention. The members which are identical to those of the first preferred embodiment shown in FIG. 1 are designated by the same reference numerals as of the first preferred embodiment, and the description thereof will therefore be omitted.

In this preferred embodiment, light generating sections 27a and 27b are provided. The light generating section 27a has a light source 2a and an optical switch 25a. The light source 2a emits a CW light having the wavelength $\lambda_1$. The light generating section 27b has a light source 2b and an optical switch 25b. The light source 2b emits a CW light having the wavelength $\lambda_n$. The wavelengths $\lambda_1$ and $\lambda_n$ of the CW lights can be controlled.

The CW lights emitted from the light sources 2a and 2b are supplied to a light mixer 26 through the optical switches 25a and 25b. The CW lights thus supplied are mixed by the light mixer and the mixed light is supplied to the optical amplifier 1. The output light of the optical amplifier 1 is supplied to the optical spectrum analyzer 6 through an optical switches 28. A modulation signal generator 29 generates modulation clocks for switching the optical switches 25a, 25b and 28.

FIGS. 13A, 13B, 14A and 14B show the variation over time of the spectrums contained in the input and output lights of the optical amplifier 1. Referring to these drawings, some examples of the operations of the preferred embodiment will be given.

Figure 13A:
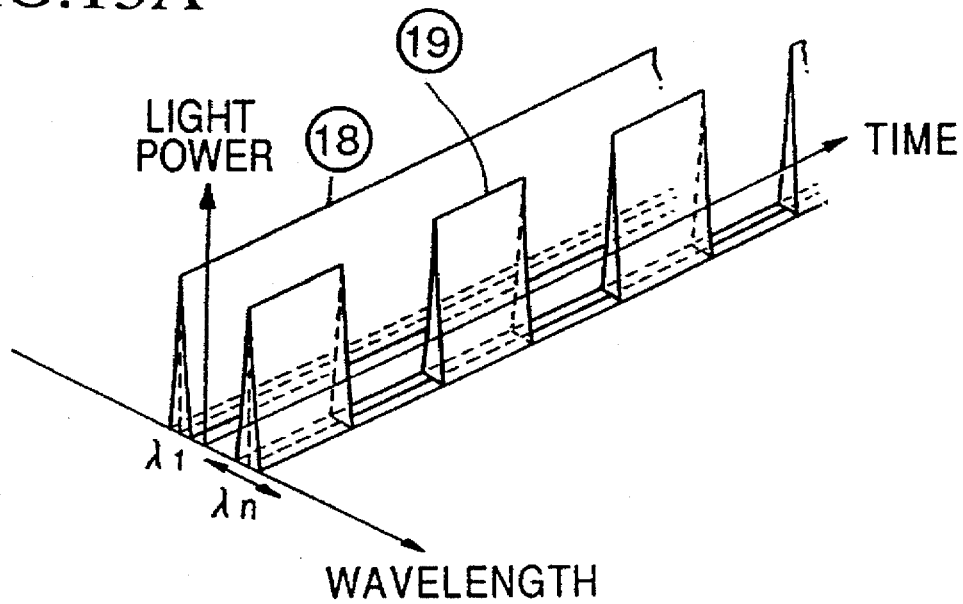
FIGS. 13A, 13B, 14A and 14B show the variation over time of the spectrums contained in the input and output lights of an optical amplifier shown in FIG. 12.
Figure 13B:
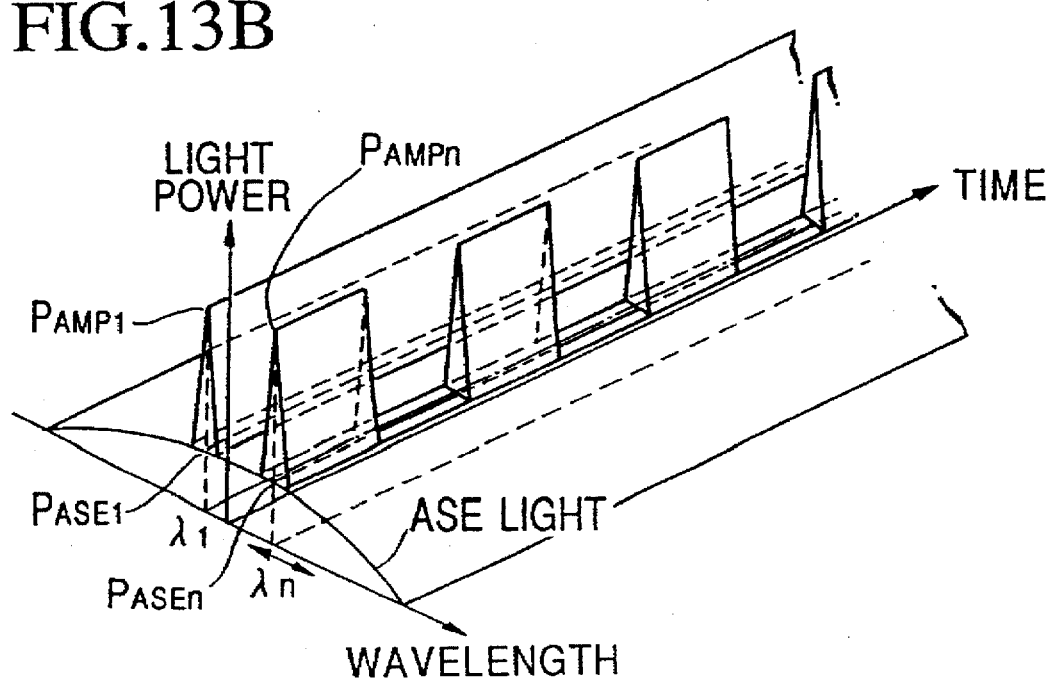

In the first example, the optical switch 25a is fixed in on ON-state and no modulation is carried out on the CW light emitted from the light source 2a. On the other hand, the optical switch 25b is switched by the modulation clock generated by the modulation signal generator 29 and the amplitude modulation is thereby carried out on the CW light emitted from the light source 2b. Therefore, the wavelength division multiplex light consisting of the CW light having the wavelength $\lambda_1$ and the light pulses having the wavelength $\lambda_n$ is supplied to the amplifier 1 through the optical amplifier 1 as shown in FIG. 13A.

The ON/OFF state of the optical switch 28 is switched by a modulation clock which is generated by the modulation signal generator 29 in synchronization with the modulation clock supplied to the optical switch 25b. The output light of the optical amplifier 1 containing the amplified light and the ASE light is supplied to the optical spectrum analyzer 6 through the optical switch 28.

The power $P_{AMPn}$ of the amplified light and the power $P_{ASEn}$ of the ASE light which have the wavelength $\lambda_n$ are distinctively detected by the spectrum analyzer 6 by controlling the phase of the modulation clock to the optical switch 28.

More specifically, when detecting the power $P_{AMPn}$, the modulation clock for switching the optical switch 28 and that for switching the optical switch 25b are generated in phase. As a result, the optical switch 28 is switched to an ON-state when the amplified light corresponding to the input light pulse having the wavelength $\lambda_n$ is outputted from the optical amplifier 1. The optical spectrum analyzer 6 then detects the power $P_{AMPn}$ of the amplified light having the wavelength $\lambda_n$ shown in FIG. 13B.

When detecting the power $P_{ASEn}$, the modulation clock for switching the optical switch 28 and that for switching the optical switch 25b are generated in anti-phase. As a result, the optical switch 28 is switched to an ON-state when the amplified light corresponding to the input light pulse having the wavelength $\lambda_n$ is not outputted from the optical switch 4 but the ASE light having the wavelength $\lambda_n$ is outputted. The optical spectrum analyzer 6 then detects the power $P_{ASEn}$ of the ASE light having the wavelength $\lambda_n$ shown in FIG. 13B.

In this manner, the powers $P_{AMPn}$ and $P_{ASEn}$ are distinctively measured by separating the output light of the optical amplifier 1 based on the phase of the output light.

The wavelength $\lambda_n$ of the light outputted from the light source 2b can be controlled. That is to say, it is possible to control the difference between the wavelengths $\lambda_n$ and $\lambda_1$. Therefore, the variation of the noise figure at the wavelength $\lambda_n$ due to the difference between the wavelengths can be determined by changing the wavelength $\lambda_n$ and by measuring the powers $P_{AMPn}$ and $P_{ASEn}$ corresponding to different wavelengths.

Figure 14A:
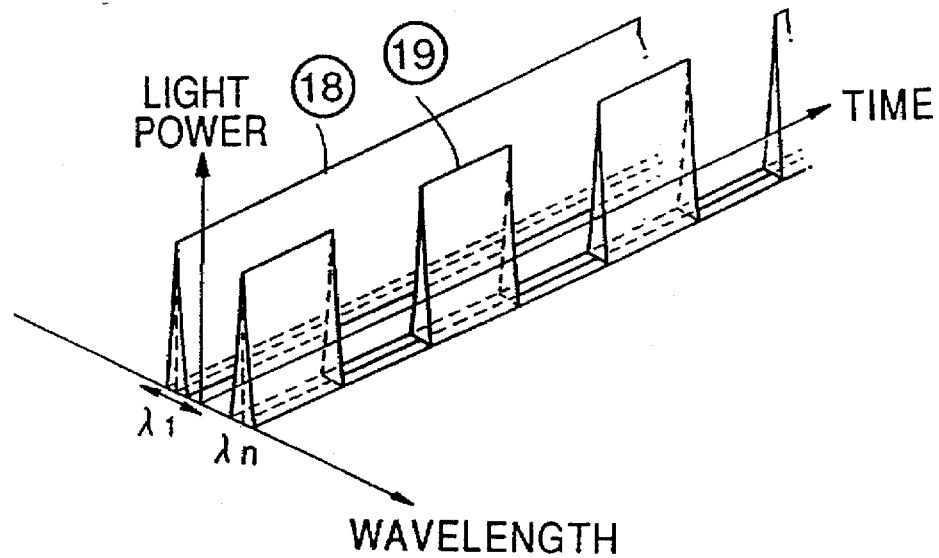
Figure 14B:
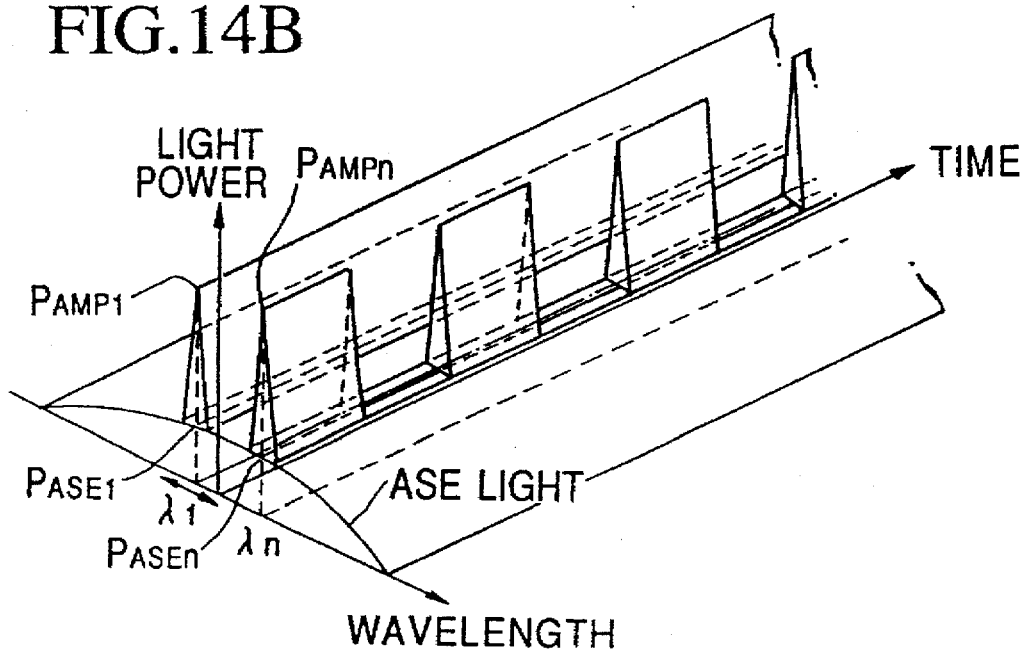

FIGS. 14A and 14B show the second example of an operation in which the noise figure $NF_n$ at the wavelength $\lambda_n$ is measured changing the wavelength $\lambda_1$ of the continuous wave light and fixing the wavelength $\lambda_n$ of the light pulse.

What is claimed is:

1. A method for measuring noise figures of an optical amplifier, comprising the steps of:

generating light pulses which have different wavelengths $\lambda_1 \sim \lambda_n$ and have a period shorter than a time constant of extinction of the optical amplifier;

supplying the light pulses to the optical amplifier;

distinctively measuring powers $P_{AMP1} \sim P_{AMPn}$ of amplified lights outputted from the optical amplifier which correspond to the light pulses and have the wavelength $\lambda_1 \sim \lambda_n$, and powers $P_{ASE1} \sim P_{ASEn}$ of lights which have the wavelength $\lambda_1 \sim \lambda_n$ and are outputted from the optical amplifier when the amplified lights are not outputted from the optical amplifier; and calculating noise figures $NF_1 \sim NF_n$ at the wavelengths $\lambda_1 \sim \lambda_n$ of the optical amplifier as described below;

$$NF_k = (P_{ASEk}/h\nu_k G_k Bo) + (1/G_k) \qquad (k=1 \sim n)$$

wherein h is Planck's constant; $\nu_k$ (k=1~n) are light frequencies of the light pulses; $G_k$ (k=1~n) are gains at the wavelengths $\lambda_k$ (k=1~n) of the optical amplifier; and Bo is a band width of a pass band of an instrument which is used for measuring the power $P_{ASE1} \sim P_{ASEn}$.

2. A method according to claim 1, wherein a plurality of light power instruments having different pass bands, which have a band width Bo and have middle wavelengths $\lambda_1 \sim \lambda_n$ are used for measuring the output light of the optical amplifier to distinctively determine the powers $P_{AMP1} \sim P_{AMPn}$ and $P_{ASE1} \sim P_{ASEn}$.

3. A method according to claim 1, wherein a plurality of light power measuring instruments, the pass bands of which have a band width Bo and can be tuned so that middle wavelengths of the pass bands are coincident with the wavelengths $\lambda_1 \sim \lambda_n$ of the light pulses, are used for measuring the output light of the optical amplifier to separately determine the powers $P_{AMP1} \sim P_{AMPn}$ and $P_{ASE1} \sim P_{ASEn}$.

4. A method according to claim 1, wherein the gains $G_k$ (k=1~n) are calculated as below;

$$G_k = (P_{AMPk} - P_{ASEk})/P_{INPUTk} \qquad (k=1 \sim n)$$

wherein $P_{INPUTk}$ (k=1~n) are light powers of the light pulses having the wavelengths $\lambda_1 \sim \lambda_n$ and supplied to the optical amplifier.

5. A method according to claim 1, wherein the light pulses having the wavelengths $\lambda_1 \sim \lambda_n$ are generated by activating a light sources, which emit lights having the wavelengths $\lambda_1 \sim \lambda_n$, by an electric modulation clock.

6. A method according to claim 1, wherein continuous wave lights having the wavelengths $\lambda_1 \sim \lambda_n$ are generated by a plurality of light sources and the continuous wave lights are chopped by a plurality of optical switches by an modulation clock to generate the light pulses having the wavelengths $\lambda_1 \sim \lambda_n$.

7. A method according to claim 1, wherein the output light of the optical amplifier is supplied to the instrument for measuring the light power through an optical switch and the optical switch is switched by a control signal synchronized to the input timing of the light pulses to the optical amplifier in order to distinctively determine the powers $P_{AMP1} \sim P_{AMPn}$ and $P_{ASE1} \sim P_{ASEn}$.

8. A method according to claim 1, wherein the optical amplifier is an erbium-doped optical fiber amplifier and pulse frequencies of the light pulses are more than several tens of kHz.

9. A method according to claim 1 wherein the optical amplifier is a semiconductor optical amplifier and pulse frequencies of the light pulses are more than 1 GHz.

10. A method according to claim 1, wherein powers at the wavelengths $\lambda_1 \sim \lambda_n$ of the amplified light and powers at wavelengths $\lambda_1 \sim \lambda_n$ of a portion of light which is outputted from the optical amplifier when the amplified light is not outputted from the optical amplifier and the plane of polarization is coincident with that of the amplified light are distinctively measured as the powers $P_{AMP1} \sim P_{AMPn}$ and the powers $P_{ASE1} \sim P_{ASEn}$.

11. A method according to claim 7, wherein the optical switch is a acoustooptic switch.

12. A method according to claim 7, wherein the optical switch is held in an ON-state during periods in which the powers $P_{AMP1} \sim P_{AMPn}$ or $P_{ASE1} \sim P_{ASEn}$ are to be measured and guard times are provided between the periods in which the optical switch is held in on ON-state and periods at which the amplitude levels of the light pulses are changed.

13. A method for measuring noise figures of an optical amplifier, comprising the steps of:

generating first and second modulation clocks in antiphase, the first and second modulation clocks having a period which is shorter than a time constant of extinction of the optical amplifier;

generating short wavelength light pulses which have different wavelengths $\lambda_1 \sim \lambda_{n/2}$ and are modulated by the first modulation clock;

generating long wavelength light pulses which have different wavelengths $\lambda_{(n/2)+1} \sim \lambda_n$ and are modulated by the second modulation clock;

mixing the short and long wavelength light pulses to generate a continuous light;

supplying the continuous light to the optical amplifier;

supplying the output light of the optical amplifier to an instrument for distinctively measuring powers of spectrums of the output light through an optical switch;

switching the optical switch in synchronization with the first or second modulation clock so that powers $PAMP_1 \sim PAMP_{(n/2)}$ at the wavelengths $\lambda_1 \sim \lambda_{n/2}$ of an amplified light which corresponds to the short wavelength pulses and powers $P_{ASE(n/2)+1} \sim P_{ASEn}$ at the wavelengths $\lambda_{(n/2)+1} \sim \lambda_n$ of a light which is outputted when the amplified light is not outputted from the optical amplifier are measured by the instrument;

switching the optical switch in synchronization with the first or second modulation clock so that powers $PAMP_{(n/2)+1} \sim PAMP_n$ at the wavelengths $\lambda_{(n/2)+1} \sim \lambda_n$ of an amplified light which corresponds to the long wavelength pulses and powers $P_{ASE1} \sim P_{ASE(n/2)}$ at the wavelengths $\lambda_1 \sim \lambda_{n/2}$ of a light which is outputted when the amplified light is not outputted from the optical amplifier are measured by the instrument;

calculating noise figures $NF_1 \sim NF_n$ at the wavelengths $\lambda_1 \sim \lambda_n$ of the optical amplifier as described below;

$$NF_k = (P_{ASEk}/h\nu_k G_k Bo) + (1/G_k) \qquad (k=1 \sim n)$$

wherein h is Planck's constant; $\nu_k(k=1 \sim n)$ are light frequencies of the light pulses; $G_k(k=1 \sim n)$ are gains at the wavelengths $\lambda_k(k=1 \sim n)$ of the optical amplifier; and Bo is a band width of a pass band of the instrument used for measuring the powers $P_{ASE1} \sim P_{ASEn}$.

14. A method for measuring noise figures of an optical amplifier, comprising the steps of:

generating a modulation clock having a period which is shorter than a time constant of extinction of the optical amplifier;

generating a continuous wave light which has a wavelength $\lambda_1$;

generating light pulses which has a wavelength $\lambda_n$ and the amplitude is modulated by the modulation clock;

supplying the continuous wave light and the light pulse to the optical amplifier;

supplying the output light of the optical amplifier to an instrument for distinctively measuring powers of spectrums of the output light through an optical switch;

changing the wavelength $\lambda_n$ of the light pulses and switching the optical switch in synchronization with the modulation clock so that power $PAMP_n$ at the wavelengths $\lambda_n$ of an amplified light which corresponds to the light pulse and a power $P_{ASEn}$ at the wavelengths $\lambda_n$ of a light which is outputted when the amplified light is not outputted from the optical amplifier are measured by the instrument;

calculating noise figures $NF_n$ at a plurality of wavelengths $\lambda_n$ of the optical amplifier as described below;

$$NF_n = (P_{ASEn}/h\nu_n G_n Bo) + (1/G_n)$$

wherein h is Planck's constant; $\nu_n$ is light frequency of the light pulse; $G_n$ is a gain at the wavelength $\lambda_n$ of the optical amplifier; and Bo is a band width of a pass band of the instrument used for measuring the power $P_{ASEn}$.

15. A method according to claim 14, wherein the noise figure $NF_n$ at the wavelength $\lambda_n$ is measured changing the wavelength $\lambda_1$ of the continuous wave light and fixing the wavelength $\lambda_n$ of the light pulses.

16. A method according to claim 7, wherein the optical switch comprises a plurality of acoustooptic switches connected in cascade.

17. A device for measuring noise figures of an optical amplifier, comprising:

light pulse supplying means for separately light pulses which have different wavelengths $\lambda_1 \sim \lambda_n$ and have a period shorter than a time constant of extinction of the optical amplifier and for supplying the light pulses to the optical amplifier; and light power measuring means for distinctively measuring powers $P_{AMP1} \sim P_{AMPn}$ of amplified lights outputted from the optical amplifier which correspond to the light pulses and have the wavelength $\lambda_1 \sim \lambda_n$, and powers $P_{ASE1} \sim P_{ASEn}$ of lights which have the wavelength $\lambda_1 \sim \lambda_n$ and are outputted from the optical amplifier when the amplified lights are not outputted from the optical amplifier.

18. A device according to claim 17, wherein the light pulse supplying means comprises:

means for generating modulation clock which has a period shorter then the time constant of extinction of the optical amplifier;

a plurality of E/O transducers for generating light pulses modulated by the modulation clock and having the different wavelengths $\lambda_1 \sim \lambda_n$; and a light mixer for mixing the light pulses and for supplying the mixed light to the optical amplifier, and the light power measuring means comprises an optical switch which is switched in synchronization with the modulation clock to distinctively detect the amplified light or the output light of the optical amplifier which is outputted when the amplified light is not outputted from the optical amplifier.

19. A device according to claim 17, further comprising calculating means for calculating noise figures $NF_1 \sim NF_n$ at the wavelengths $\lambda_1 \sim \lambda_n$ of the optical amplifier as described below;

$$NF_k = (P_{ASEk}/hv_k G_k Bo) + (1/G_k) \qquad (k=1 \sim n)$$

wherein h is Planck's constant; $v_k(k=1\sim n)$ are light frequencies of the light pulses; $G_k(k=1\sim n)$ are gains at the wavelengths $\lambda_k(k=1\sim n)$ of the optical amplifier; and Bo is a band width of a pass band of an instrument which is used for measuring the power $P_{ASE1 \sim PASEn}$.

* * * * *